US010779646B2

(12) United States Patent
Baraldi et al.

(10) Patent No.: US 10,779,646 B2
(45) Date of Patent: Sep. 22, 2020

(54) FURNITURE SYSTEM AND ARRANGEMENT THEREOF

(71) Applicant: QubicaAMF Worldwide, LLC, Mechanicsville, VA (US)

(72) Inventors: Massimo Baraldi, Bologna (IT); Tommaso Parisi, Bologna (IT); Samuel Ramesh Namala, Mechanicsville, VA (US); Leroy T. Warren, Richmond, VA (US); Charles A. Lee, Williamsburg, VA (US)

(73) Assignee: QubicaAMF Worldwide, LLC, Mechanicsville, VA (US)

( * ) Notice: Subject to any disclaimer, the term of this patent is extended or adjusted under 35 U.S.C. 154(b) by 945 days.

(21) Appl. No.: 14/340,846

(22) Filed: Jul. 25, 2014

(65) Prior Publication Data

US 2015/0030384 A1    Jan. 29, 2015

Related U.S. Application Data

(60) Provisional application No. 61/858,422, filed on Jul. 25, 2013.

(51) Int. Cl.
*F16B 12/20* (2006.01)
*A47B 83/00* (2006.01)
*A47B 87/00* (2006.01)

(52) U.S. Cl.
CPC .......... *A47B 83/00* (2013.01); *A47B 87/002* (2013.01); *A47B 87/007* (2013.01); *F16B 12/2027* (2013.01); *Y10T 403/591* (2015.01)

(58) Field of Classification Search
CPC .......... A47B 47/0066; A47B 47/0075; A47B 47/0091; A47B 47/042; A47B 47/047; A47B 2220/00; A47B 95/00; A47B 87/005; A47B 87/007; A47B 87/008; Y10T 403/59; Y10T 403/595; Y10T 403/75; F16B 5/06;

(Continued)

(56) References Cited

U.S. PATENT DOCUMENTS 4,668,011 A    5/1987 Fister, Jr.
5,083,838 A    1/1992 Maxwell, Jr.
(Continued)

FOREIGN PATENT DOCUMENTS

DE          30 11 843    * 10/1981    .............. F16B 12/02
DE       202010017588         2/2012
(Continued)

OTHER PUBLICATIONS

Office Action in related U.S. Appl. No. 15/855,392 dated Mar. 12, 2020, 8 pages.

*Primary Examiner* — Michael P Ferguson
(74) *Attorney, Agent, or Firm* — Andrew M. Calderon; Roberts Calderon Safran & Cole, P.C.

(57) ABSTRACT

A modular furniture system capable of being arranged in different configurations in a settee area of a bowling center, for example, is disclosed. The furniture system includes at least one modular furniture element with a fastening mechanism which includes a first assembly and a second assembly. The first assembly of the fastening mechanism includes an engaging element which extends through at least one component of the first assembly and attaches to a component of the second assembly of an adjacent modular furniture element.

23 Claims, 19 Drawing Sheets

(58) Field of Classification Search
CPC .... F16B 5/0607; F16B 5/0621; F16B 5/0642; F16B 2005/0678; F16B 12/10; F16B 12/12; F16B 12/20; F16B 12/22; F16B 12/24; F16B 12/32; F16B 12/34; F16B 12/36

See application file for complete search history.

(56) References Cited

U.S. PATENT DOCUMENTS

| | | | |
|---|---|---|---|
| 5,470,128 A | 11/1995 | Kerkham | |
| 6,409,037 B1 * | 6/2002 | Lin | A47B 47/042 220/23.4 |
| 6,543,845 B2 | 4/2003 | Seitz et al. | |
| 6,679,646 B2 * | 1/2004 | Quardt | H05K 5/0021 24/573.09 |
| 7,347,493 B2 | 3/2008 | Mulmed | |
| 7,537,409 B2 * | 5/2009 | Huhnerbein | F16B 12/2009 403/348 |
| 7,806,474 B2 | 10/2010 | Wahl et al. | |
| 8,528,972 B2 | 9/2013 | Johnsson | |
| 9,488,204 B2 | 11/2016 | King | |
| 2006/0250052 A1 * | 11/2006 | Davis | A47B 47/042 312/107 |
| 2011/0194890 A1 * | 8/2011 | Chang | F16B 12/24 403/241 |

FOREIGN PATENT DOCUMENTS

| | | | | |
|---|---|---|---|---|
| FR | 2321253 | | 3/1977 | |
| GB | 1406088 | | 9/1975 | |
| WO | WO 2008/052269 | * | 5/2008 | .............. F16B 12/34 |
| WO | WO 2012/099212 | * | 7/2012 | .............. F16B 12/20 |

* cited by examiner

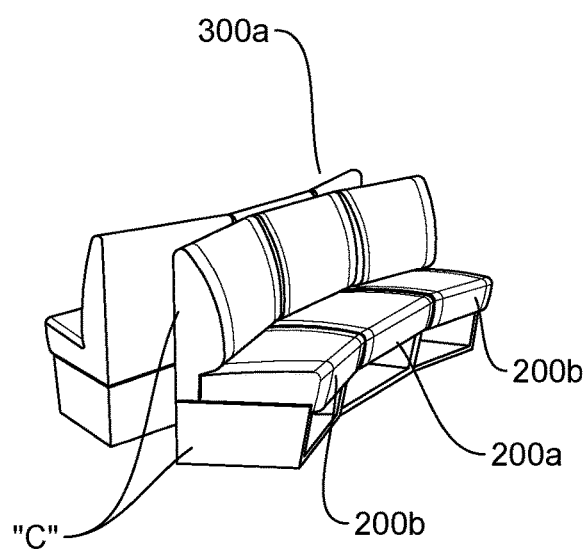 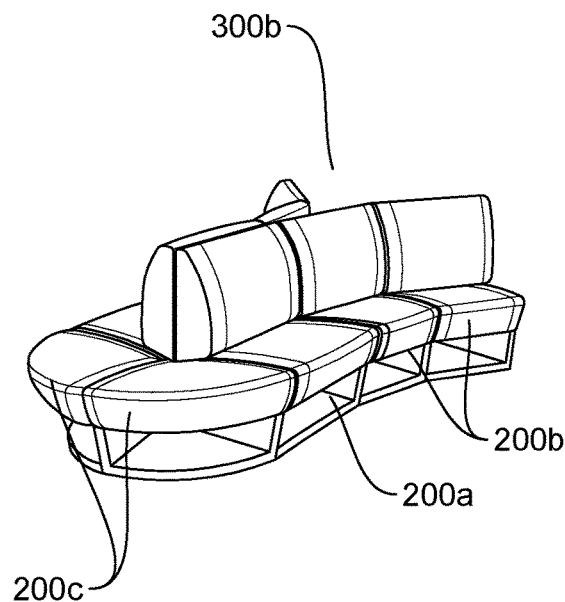
FIG. 3A  FIG. 3B
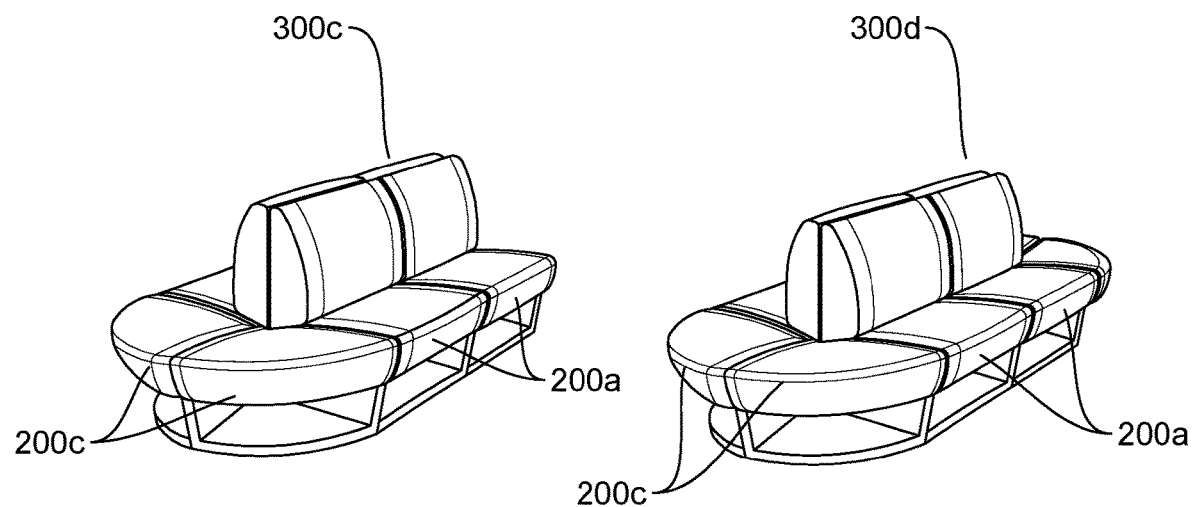
FIG. 3C  FIG. 3D

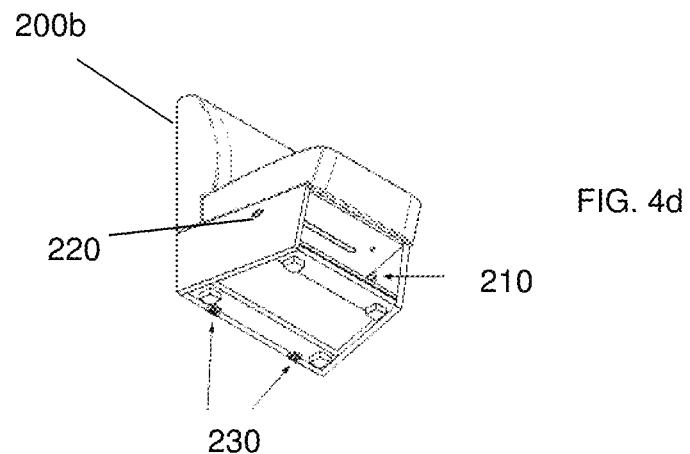
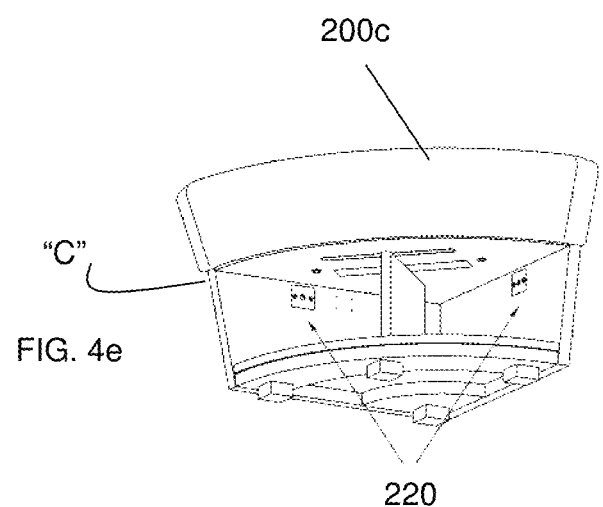

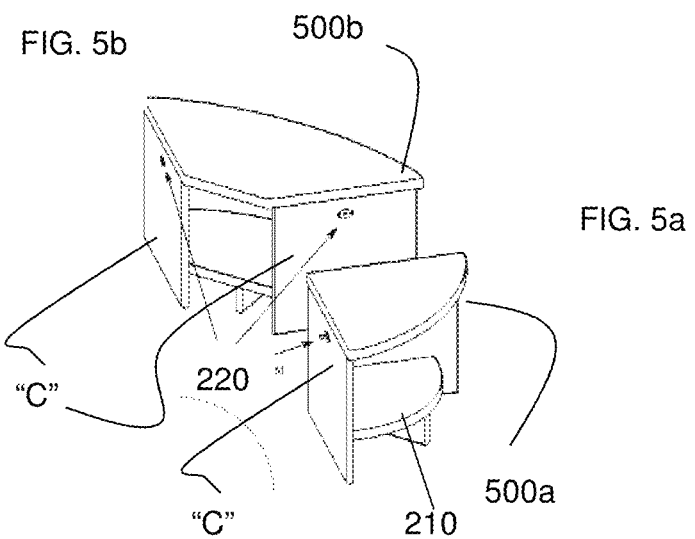
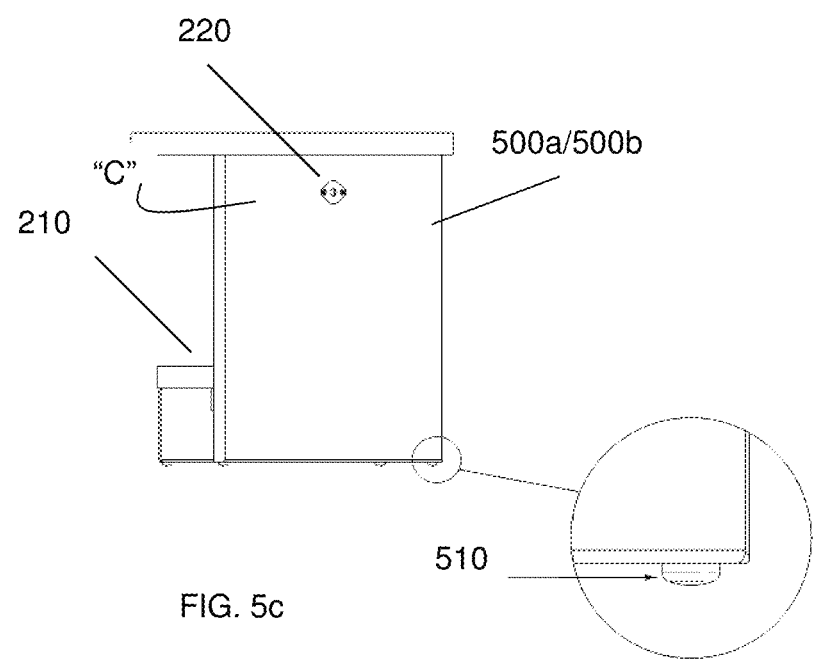

FURNITURE SYSTEM AND ARRANGEMENT THEREOF

BACKGROUND OF THE INVENTION

1. Field of the Invention

The present invention relates to a furniture system and arrangement thereof and more particularly to a modular furniture system capable of being arranged in different configurations in a settee area of a bowling center, for example.

2. Discussion of Background Information

As shown representatively in FIG. 1, a bowling center 10 typically comprises a plurality of bowling lanes 12 and seating within a settee area 16, e.g., the bowlers' area, amongst other features. By way of more specific illustration, the settee area 16 can be defined as the space between the start of the "approach area" 14, i.e., an area behind the foul line on which the bowler takes his/her steps prior to delivering the ball, to the start of the "concourse area" 18, i.e., the area behind the lane where spectators sit. It is known that the settee area 16 can have different dimensions, with common standard measurements being about 9 feet, 12 feet and 15 feet. The specific measure of the settee area changes the possibility to arrange the furniture in this area. Usually, in the bowling centers, the measure of the settee area determines the choice of the furniture to be applied.

The settee area 16 and the concourse area 18 typically include seating 20. As should be understood, spectators usually sit in the seating 20 in the concourse 18; whereas, bowlers or game participants typically sit in the seating 20 in the settee area 16. The settee area 16 and concourse area 18 can also include tables for food and beverages, etc. The seating 20 can be representative of chairs, sofas and benches. The seating area can also include tables for food and beverage consumption including coffee tables, personal tables, ottomans and more.

However, current furniture systems within bowling entertainment centers do not provide flexibility in their arrangements. Typically, these furniture systems are fixed to the floor and do not provide any accommodations for mixing and matching of different configurations or providing for the custom needs of a customer. Moreover, no effective furniture solution exists for smaller settee areas. Instead, current solutions often create congestion in the settee area and consumer confusion as to what space is available for different bowling lanes.

Accordingly, there exists a need in the art to overcome the deficiencies and limitations described hereinabove.

SUMMARY OF THE INVENTION

In an aspect of the invention, a furniture system comprises at least one modular furniture element with a fastening mechanism comprising a first assembly and a second assembly. The first assembly of the fastening mechanism comprises an engaging element which extends through at least one component of the first assembly and attaches to a component of the second assembly of an adjacent modular furniture element.

In another aspect of the invention, a furniture system comprises a first modular furniture element comprising a first assembly of a locking mechanism and a second modular furniture element comprising a second assembly of the locking mechanism. The first assembly and the second assembly comprise: a cam plate provided on an interior side of the first modular furniture element and the second modular furniture element; a cam latch exterior plate provided on an exterior side of the first modular furniture element and the second modular furniture element; and a fastening system connecting the cam plate to the cam latch exterior plate on opposing sides of a wall. The first assembly of the locking mechanism additionally comprises a lockable element which extends through an opening of the cam plate and cam latch exterior plate of the first modular furniture element and engages with one of the cam latch exterior plate and cam plate of the second modular furniture element.

In yet another aspect of the invention, a furniture system comprises a first modular furniture element having at least one contacting surface. The furniture system further comprises a second modular furniture element having at least one contacting surface which is structured and dimensioned to correspond with the at least one contacting surface of the first modular furniture element such that when placed together the least one contacting surface of the first modular furniture element is parallel to and contacts with the at least one contacting surface of the second modular furniture element to form an uninterrupted singular, unitary furniture element. The furniture system further comprises an attachment mechanism which connects the first modular furniture element to the second modular furniture element at the contact surfaces.

BRIEF DESCRIPTION OF THE DRAWINGS

These and other innovative aspects, or advantageous features are set out in the appended claims and the technical features and advantages of the invention are apparent from the detailed description which follows of preferred embodiments of it, to be considered purely as non-limiting examples. The description is made with reference to the accompanying drawings, in which:

FIGS. 3a-3h show exemplary layouts of sofa arrangements, implementing the seating system of the present invention.

FIGS. 4a-4e show additional perspective views of the different modular furniture seating elements in accordance with aspects of the present invention.

FIGS. 5a-5c show perspective views of different modular furniture table elements in accordance with aspects of the present invention.

DETAILED DESCRIPTION OF THE INVENTION

Figure 1:
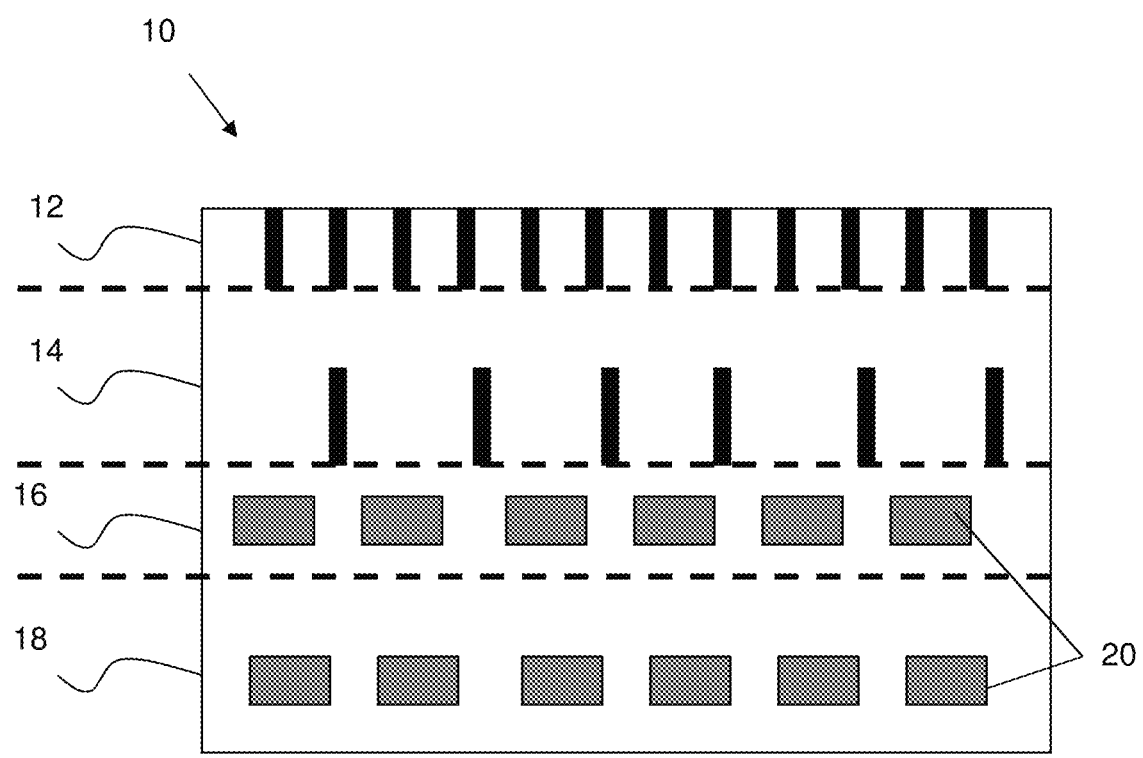
FIG. 1 shows a schematic representation of a bowling center.

The present invention relates to a furniture system and arrangement thereof and more particularly to a modular furniture system capable of being arranged in different configurations in a settee area (or other areas) of a bowling center. For example, in embodiments, the modular furniture system of the present invention offers many different seating and table arrangements using various different furniture elements, particularly within a settee area of a bowling center for mixing and matching of different furniture configurations. It should be understood that the furniture system of the present invention can be provided in other locations throughout a facility, e.g., bowling center.

More specifically and advantageously, the furniture system of the present invention includes a latch mechanism compatible with different modular seating and table elements, thus providing versatility to connect different furniture elements together for different settee area dimensions and configurations. For example, the furniture system of the present invention is configurable with different seating and table arrangements within any settee area, etc., regardless of available space or dimensions. Also, advantageously, the furniture system can be easily reconfigured within any space and with different furniture elements by simply using the latch mechanism of the present invention, in order to provide design flexibility with different seating arrangements.

The furniture elements of the present invention can be, e.g., sofa elements, chairs, coffee table elements, "personal" tables with particular features and/or a wedge ball rack, amongst other furniture elements. Accordingly, by using the latch mechanism of the present invention it is now possible to provide increased versatility for seating solutions in a bowling center using the many different furniture elements of the present invention.

Moreover, the furniture system of the present invention allows furniture manufacturers to produce furniture elements that can be used with all different consumer segments with their requirements of different seating configurations. For example, the furniture system can include very high end furniture elements, as well as other customer segments, e.g., to accommodate families, group of friends, birthday parties, tournaments, etc. That is, the present invention can accommodate different consumer segments which require different seating configurations and arrangements which are easily adaptable and which accommodate predetermined number of seats and predetermined configurations. In general, the present invention can thus provide many advantages and alternatives which are not currently available to bowling entertainment centers including, amongst others:

1. The bowling entertainment centers can now choose furniture that not only fits and looks acceptable to certain spaces, but which can be flexibly designed to provide functional areas with modularity needed for today's business challenges and to maximize customer comfort;

2. The bowling entertainment centers can choose commercially available furniture options that might give them many different furniture elements to choose from, with the functionally designed for their needs, to hold up in the bowling environment and to look good together; and 3. The bowling entertainment centers do not need to have their furniture custom-made which is very expensive, time consuming and difficult to obtain support after sale. And, even with very rich custom furniture, the present invention provides the needed flexibility and ease to rearrange and configure different furniture elements into different configurations, which is acceptable for the customer.

Figure 2A:
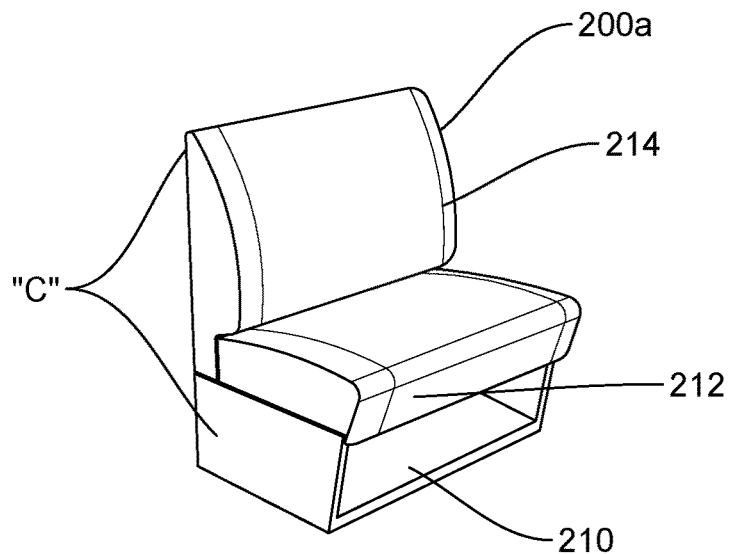
FIGS. 2a-2c show perspective views of different furniture seating elements in accordance with aspects of the present invention.
Figure 2B:
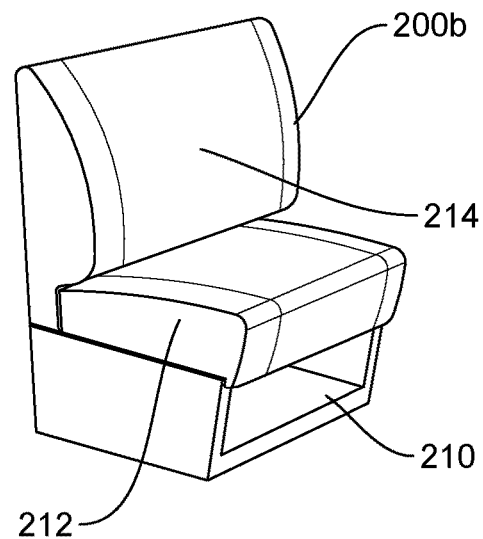
Figure 2C:
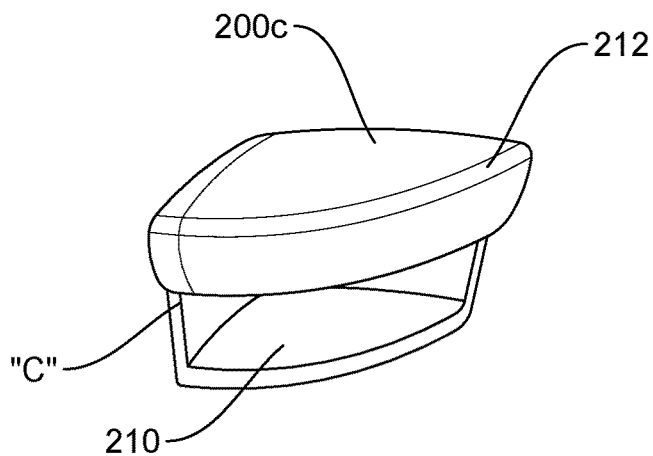
Figure 3E:
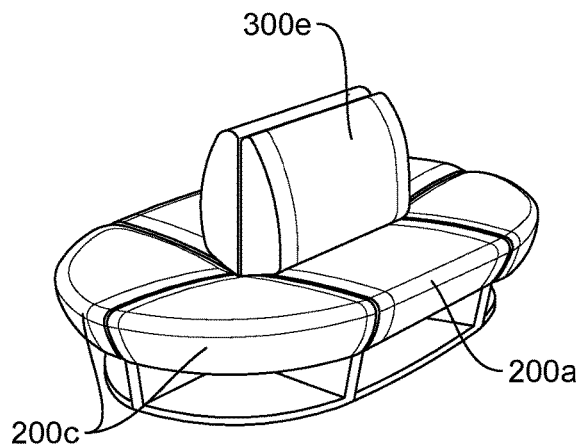
Figure 3F:
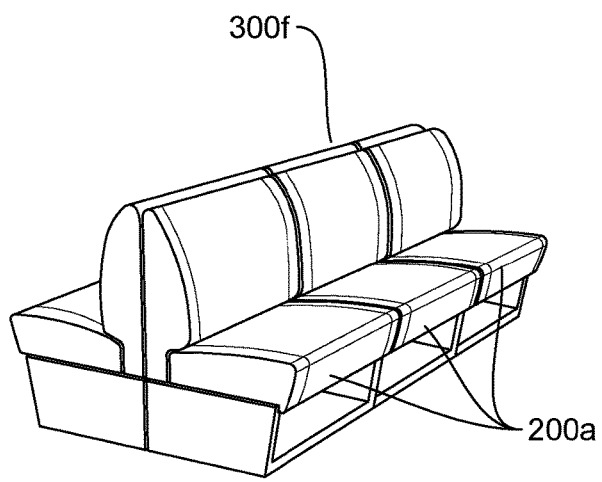
Figure 3G:
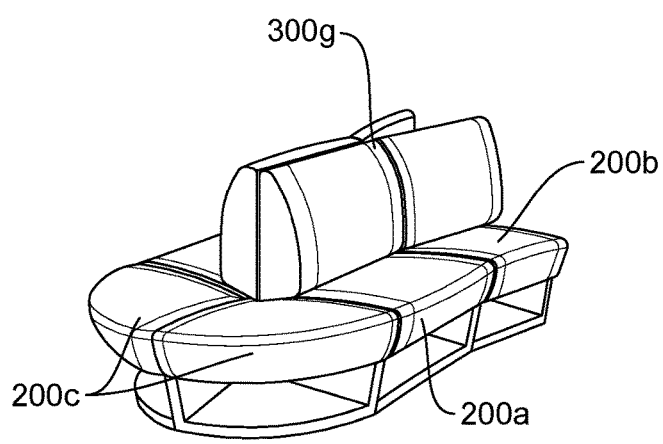
Figure 3H:
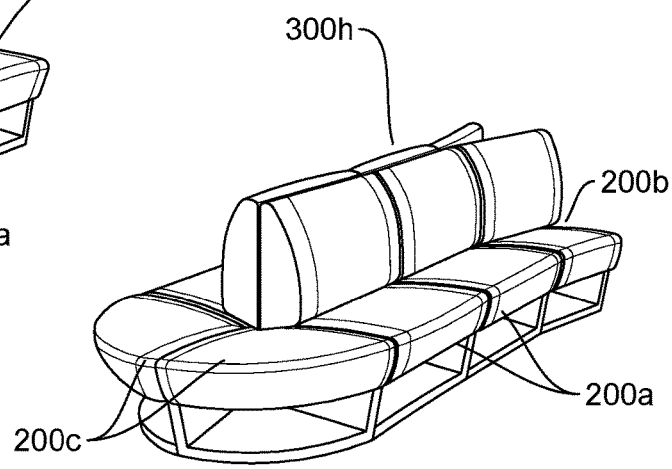

FIGS. 2a-2c show perspective views of different furniture seating elements in accordance with aspects of the present invention. More specifically, FIGS. 2a-2c show different seating elements which can be combined together to form different sofa arrangements as shown at reference numerals 300a-330h in FIGS. 3a-3h. That is, as shown in FIGS. 2a-2c and FIGS. 3a-3h any combination of a straight singular modular seating element 200a of FIG. 2a can be combined with a singular wedge shaped modular seating element 200b of FIG. 2b and/or a quarter round modular seating element 200c of FIG. 2c to form various sofa arrangements as shown in FIGS. 3a-3h.

As should be understood by those of skill in the art and as discussed in more detail herein, each of the modular furniture elements of the present invention can be combined together in different configurations and/or arrangements using a latch mechanism in accordance with aspects of the present invention. This being the case, each of the modular furniture elements, whether it be a seating element (shown in FIGS. 2a-c) a table element (shown in FIGS. 5a-6e) or a ball rack system (shown in FIG. 7a) or any combination therefore (as shown in FIGS. 8a-9n) include a least one contacting surface "C" which is structured and dimensioned to correspond with the at least one contacting surface of an adjacent modular furniture element to form an uninterrupted singular, unitary furniture element (see, e.g., FIGS. 9a-9n). By implementing the latch mechanism, the different modular elements, e.g., shown in FIGS. 2a-2c, can be combined in endless combinations of sofa arrangements (some non-limiting exemplary arrangements of which are shown FIGS. 3a-3h) and other combinations as shown in, e.g., FIGS. 8a-9n. And, as discussed herein, by implementing the latch mechanism, each of the different furniture elements, e.g., 200a-200c, can be fastened together and unfastened easily into the several different modular building blocks, which permits endless combinations of sofa arrangements for settee areas with different available space requirements. In this way, the modular seating elements can be arranged in many different combinations and configurations even after initial installation.

Still referring to FIGS. 2a-2c, the different modular seating elements 200a, 200b, 200c can also include a storage unit (e.g., compartment) 210 under the seat, itself. Moreover, the different modular seating elements 200a, 200b, 200c can include a fully upholstered seat 212; whereas the modular seating elements 200a, 200b can additionally include a fully upholstered backrest 214. For example, the seat 212 and backrest 214 can be padded and covered with different materials. The padding, for example, can be a foamed material or other known padding material. The material for the seat and the backrest can be, for example, fabric, vinyl, leather or other seating materials known to those of skill in the art.

Figure 4A:
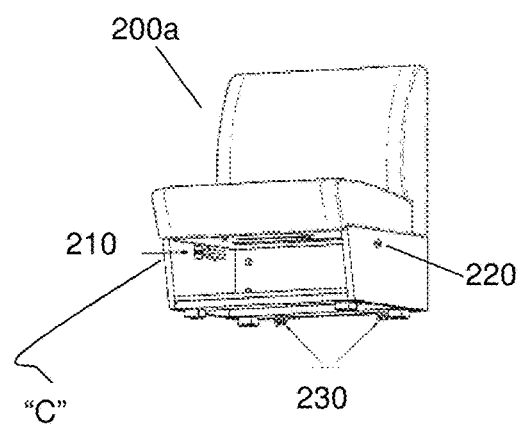
Figure 4B:
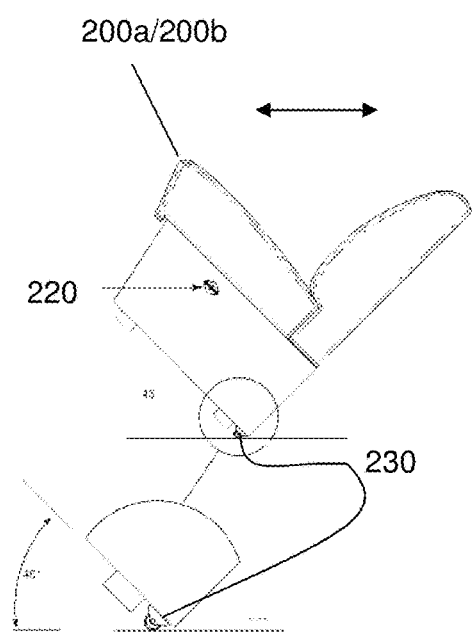
Figure 4C:
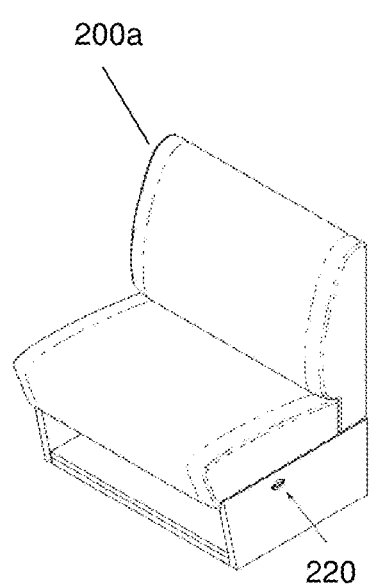

FIGS. 4a-4e show additional perspective views of the different modular furniture seating elements 200a-200c in accordance with aspects of the present invention. As shown in FIGS. 4a-4c, the different modular seating elements 200a, 200b, 200c each include a storage unit 210 under the seat, itself. The storage unit 210 can store, for example, bags, shoes, or other objects of bowlers, amongst other items. Also, the straight singular modular seating element 200a, singular wedge shaped modular seating element 200b, and quarter round modular seating element 200c of FIGS. 4a-4e each include a latch mechanism 220. The latch mechanism 220 can be a fastening, attaching or locking mechanism (hereinafter referred to as a latch mechanism), provided with any of the modular furniture elements described herein. The latch mechanism can be provided on both sides of each of the different modular seating elements 200a, 200b, and 200c, to provide the ability to easily combine and reconfigure different combinations of modular furniture elements together to form different seating arrangements. That is, by using the latch mechanism 220 of the present invention, the modular furniture elements can easily be fixed together in a secure way and reconfigured or changed into different configurations, without the intervention of a technician, mechanic or any specialized tools. In further embodiments, the latch mechanism can be a clip which is used to attach module furniture elements together.

Referring still to FIGS. 4a-4d, the modular furniture seating elements 200a, 200b can also include wheels 230. In embodiments, the wheels 230 can be different types of casters, e.g., single casters, dual casters, hooded casters, locking casters, amongst other types of known wheel systems. In embodiments, the wheels 230 can be provided on the underside of the modular furniture seating elements 200a, 200b toward the back portion thereof. In this way, as specifically shown in FIG. 4b, it is possible to tilt the modular furniture seating elements in order to easily move them in the settee area, for example.

FIGS. 5a-5c show perspective views of the different modular furniture table elements in accordance with aspects of the present invention. More specifically, FIGS. 5a-5c show different table elements 500a, 500b which can be combined together to form different table arrangements as shown at reference numerals 600a-600d in FIGS. 6a-6e. In embodiments, the different table elements 500a, 500b can be a small quarter round table element 500a and a large quarter round table element 500b, each with a glide mechanism 510 on an underside to facilitate movement of these furniture elements 500a, 500b. The small quarter round table element 500a and the large quarter round table element 500b can also include a shelf 210 and the latch mechanism 220.

Figure 6A:
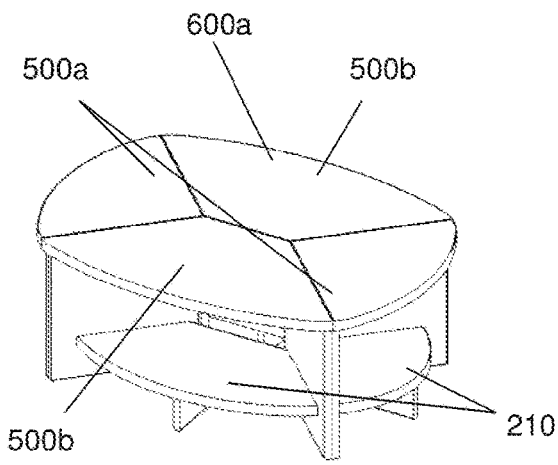
FIGS. 6a-6e show combinations of table elements in accordance with aspects of the present invention.
Figure 6B:
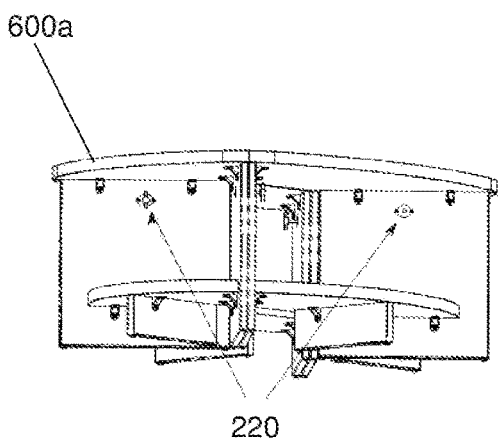
Figure 6C:
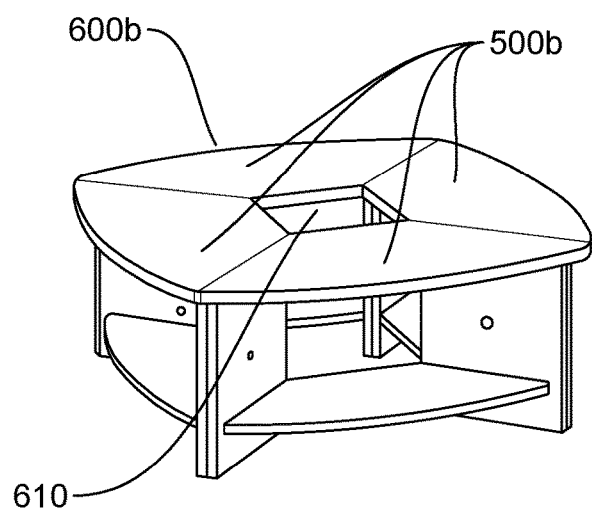
Figure 6D:
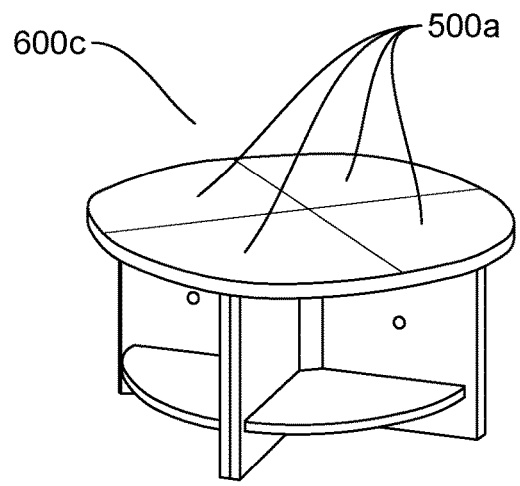
Figure 6E:
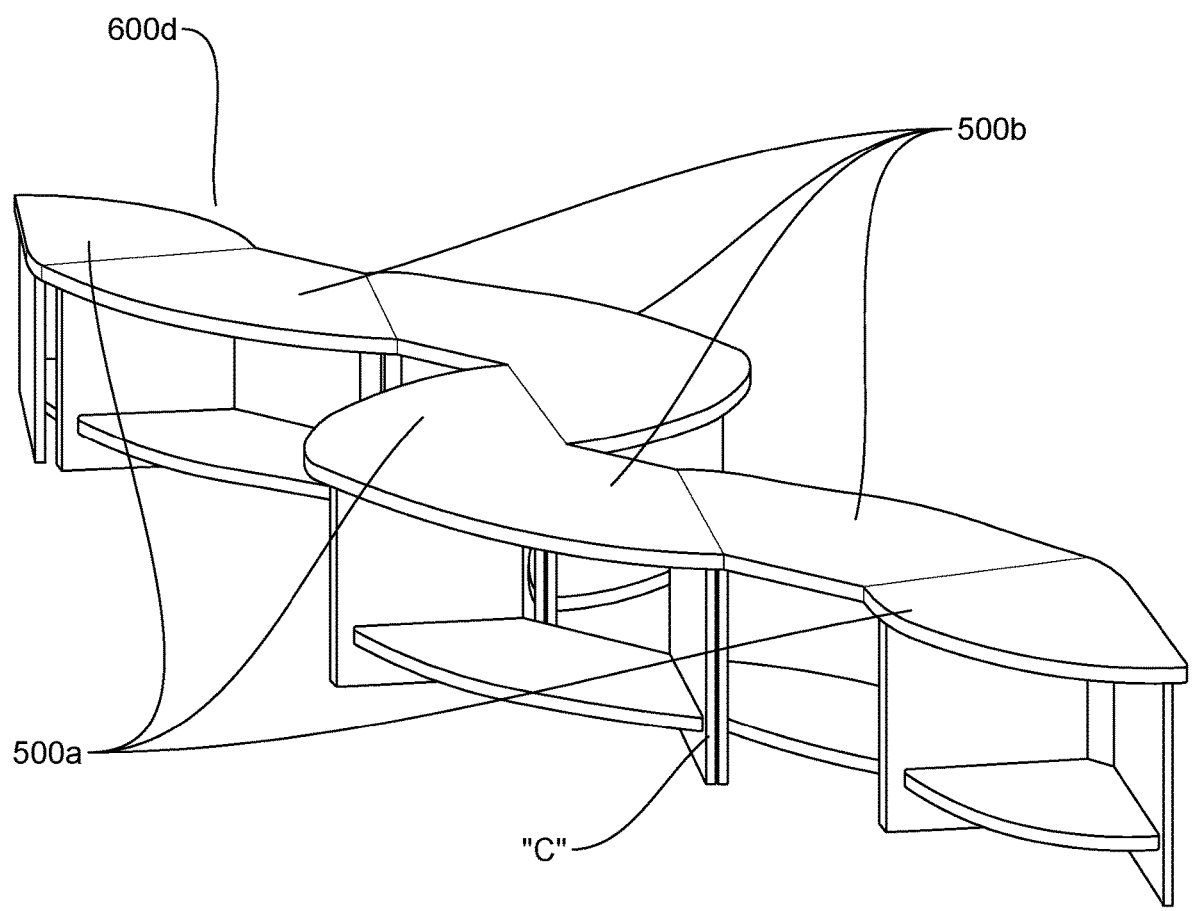

As shown in FIGS. 6a-6e, any combination of a small quarter round table element 500a and a large quarter round table element 500b can be combined together with the latch mechanism 220 to form countless and various different table arrangements. Illustrative, non-limiting examples of the table arrangements (e.g., arranged at the contacting surfaces "C") can be, for example:

(i) a combination of the small quarter round table elements 500a and large quarter round table elements 500b to form an oval table arrangement 600a shown in FIGS. 6a and 6b;

(ii) a combination of large quarter round table elements 500b to form a large circular table arrangement 600b shown in FIGS. 6c (with an opening 610 in the center);

(ii) a combination of small quarter round table elements 500a to form a smaller circular table arrangement 600c shown in FIGS. 6d; and/or (iii) a combination of the small quarter round table elements 500a and large quarter round table elements 500b to form the serpentine table arrangement 600d shown in FIGS. 6e.

Figure 7A:
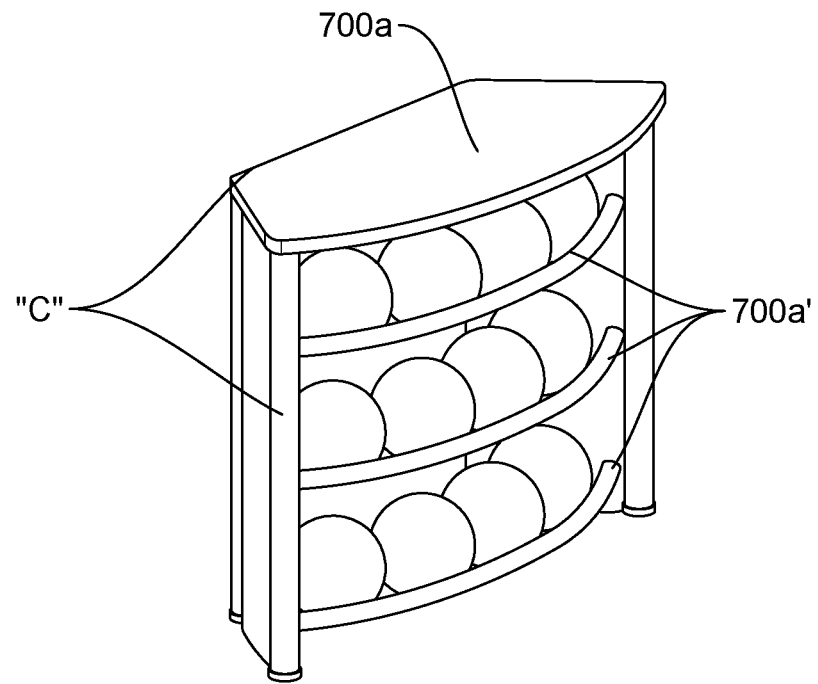
FIGS. 7a and 7b show additional furniture elements in accordance with aspects of the present invention.
Figure 7B:
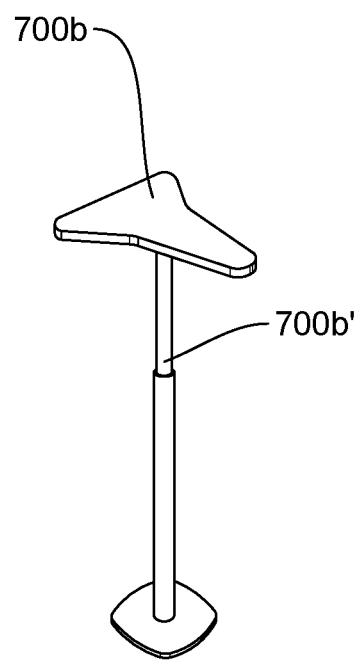

FIGS. 7a and 7b show additional furniture elements in accordance with aspects of the present invention. Specifically, FIG. 7a shows a ball rack system 700a and FIG. 7b shows a triangular table (personal table) 700b. The ball rack system 700a can include a plurality of shelves 700a' for storage of bowling balls. The triangular table 700b can include a pedestal 700b' which can be raised and lowered (using, e.g., a lockable gas spring system) to different heights, e.g., to the height of the ball rack or any of the seating arrangements or table arrangements.

Figure 8A:
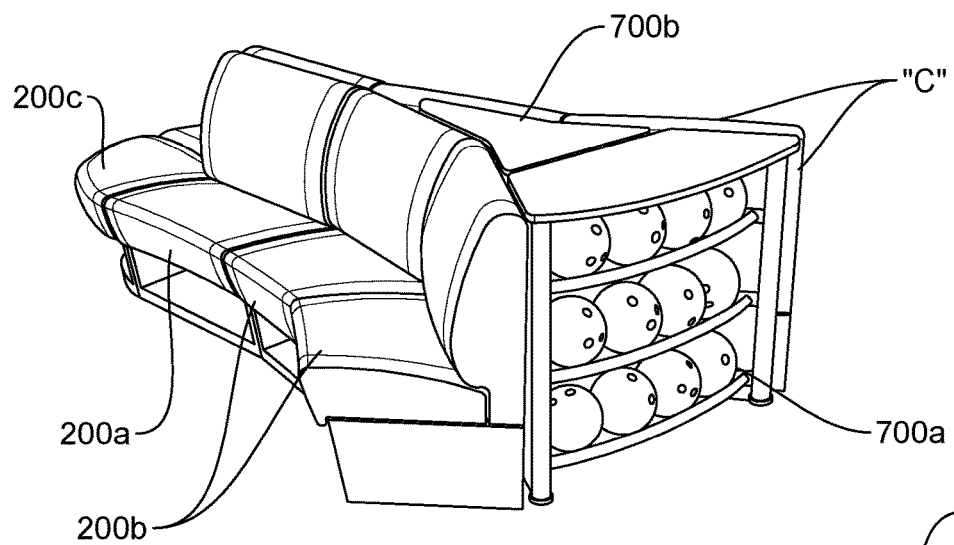
FIGS. 8a-8c show various configurations using a ball rack system and table in accordance with aspects of the present invention.
Figure 8B:
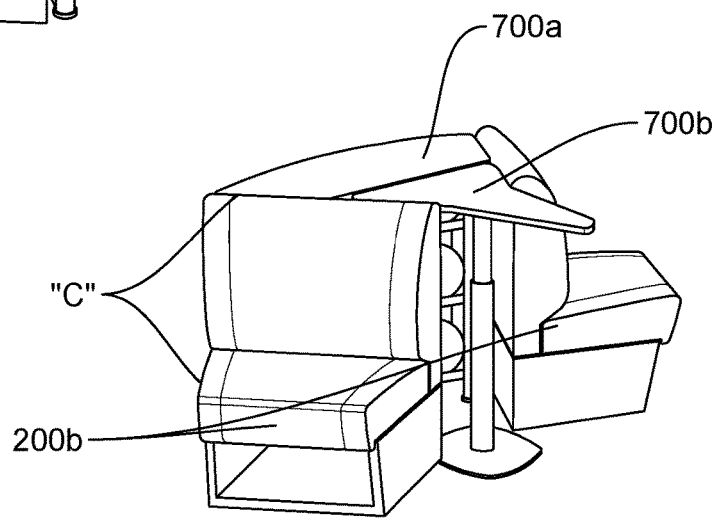
Figure 8C:
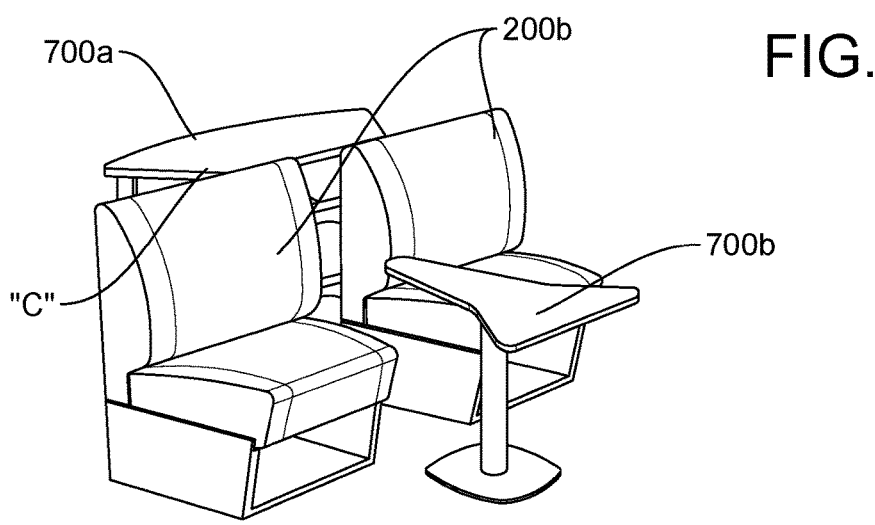

FIGS. 8a-8c show various configurations using the ball rack system 700a and triangular table (personal table) 700b. Specifically, FIG. 8a shows a combination of the ball rack system 700a and triangular table (personal table) 700b nestled between the wedge shaped seating elements 200b, used in combination with the seating elements 200a and 200c. FIG. 8b shows a combination of the ball rack system 700a and triangular table (personal table) 700b nestled between opposing wedge shaped seating elements 200b. FIG. 8c shows the ball rack system 700a arranged behind the wedge shaped seating elements 200b, with the triangular table (personal table) 700b arranged in front of the wedge shaped seating elements 200b.

Figure 9A:
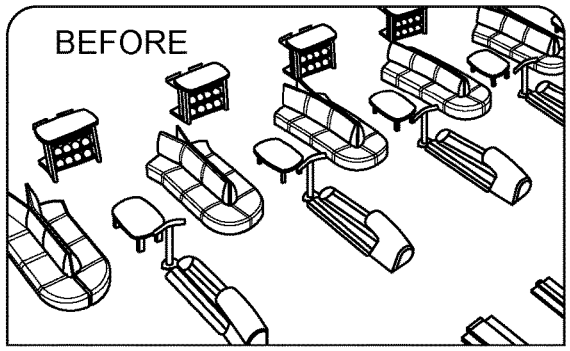
FIGS. 9a-9n show different combinations of furniture elements for different settee areas, group settings, number of lanes etc., in accordance with aspects of the present invention.
Figure 9B:
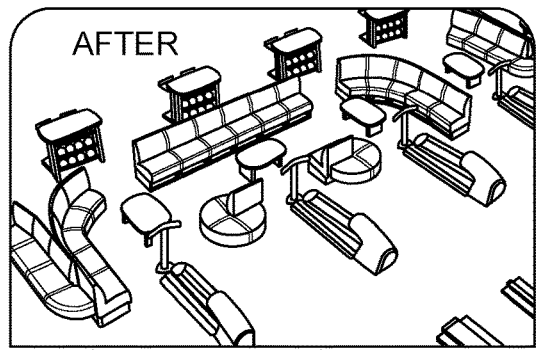
Figure 9C:
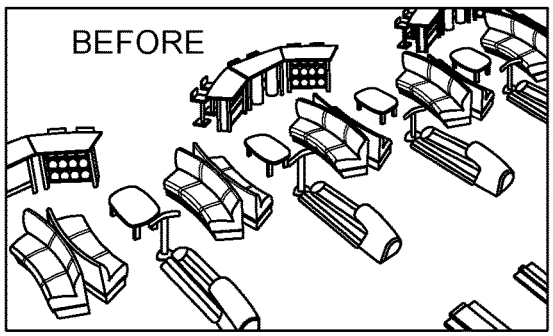
Figure 9D:
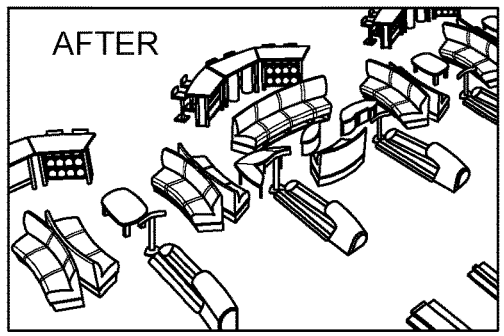
Figure 9E:
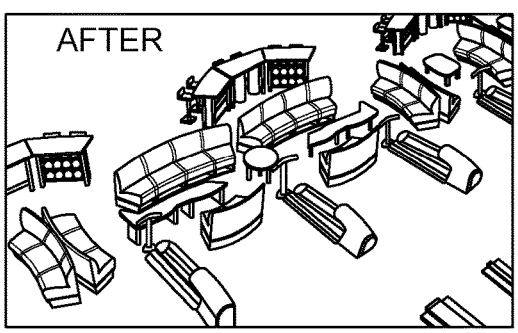
Figure 9F:
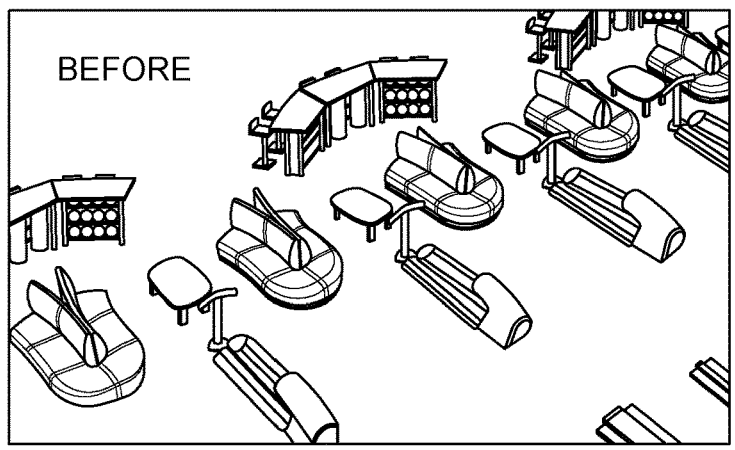
Figure 9G:
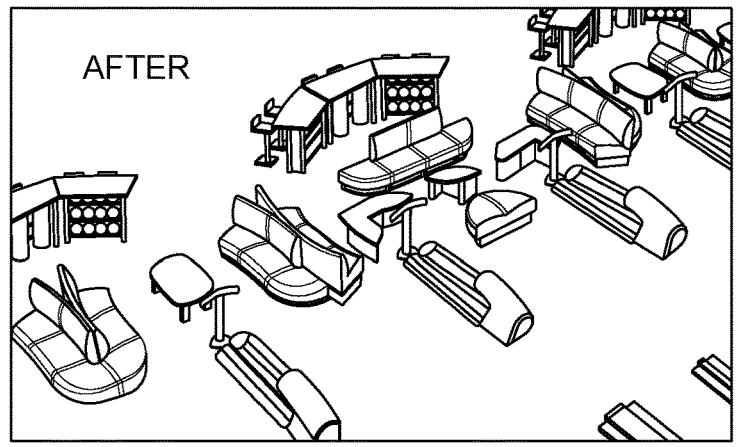
Figure 9H:
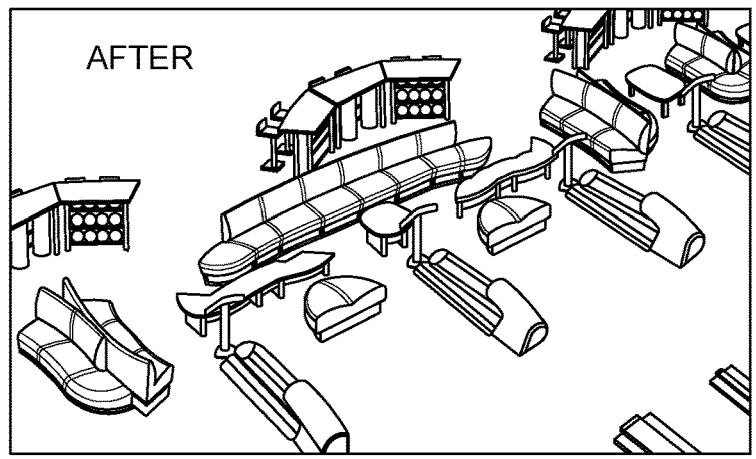
Figure 9I:
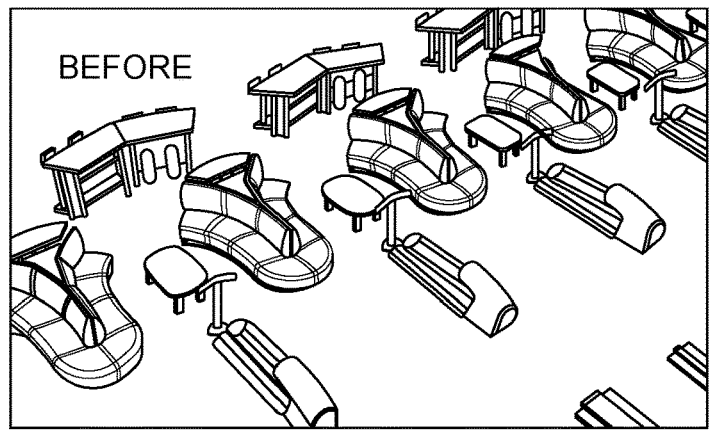
Figure 9J:
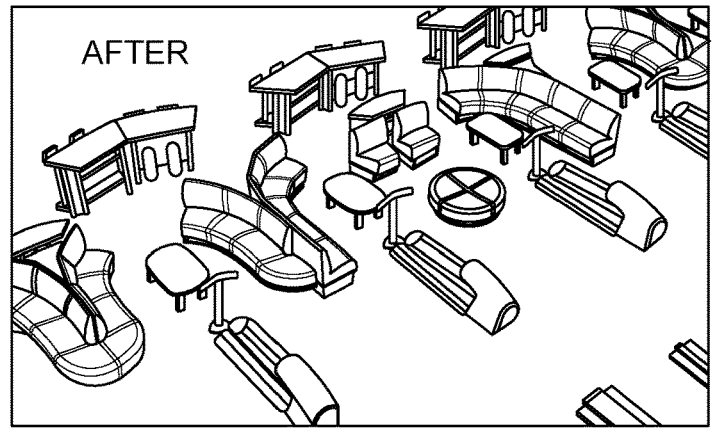
Figure 9K:
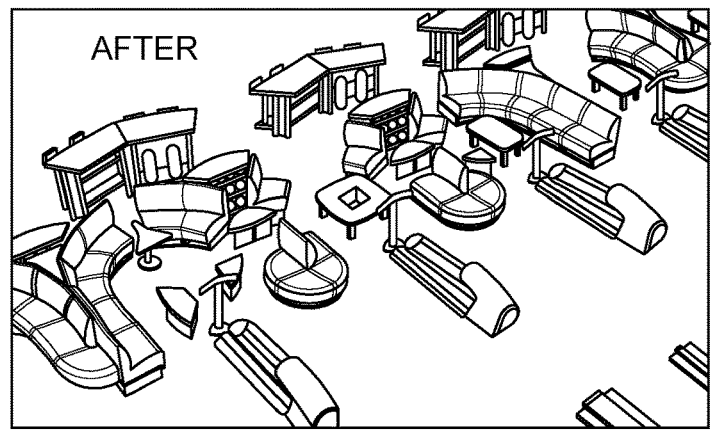
Figure 9L:
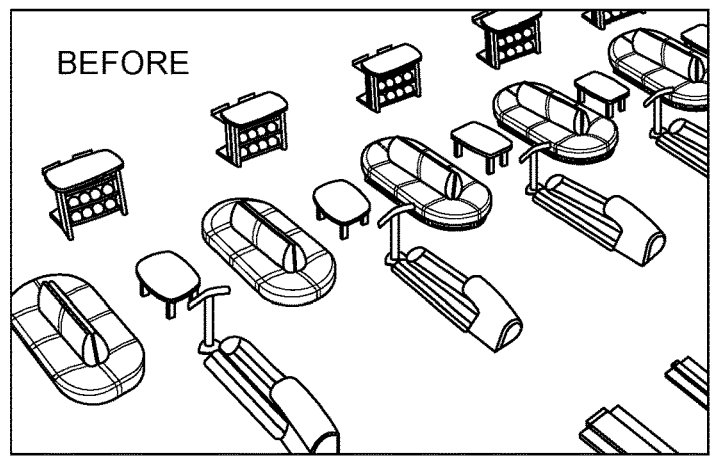
Figure 9M:
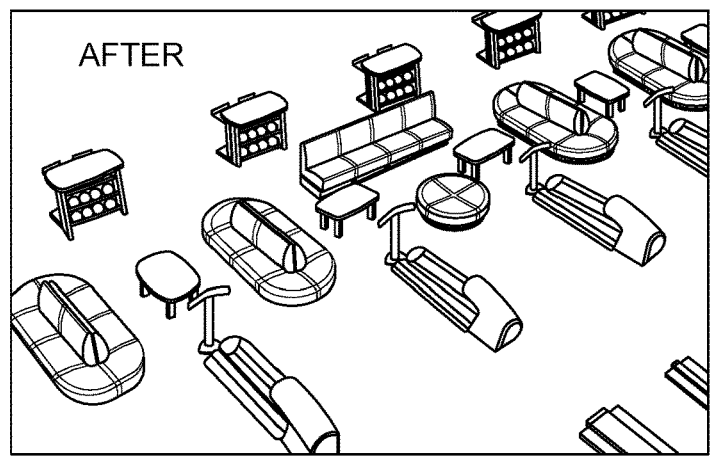
Figure 9N:
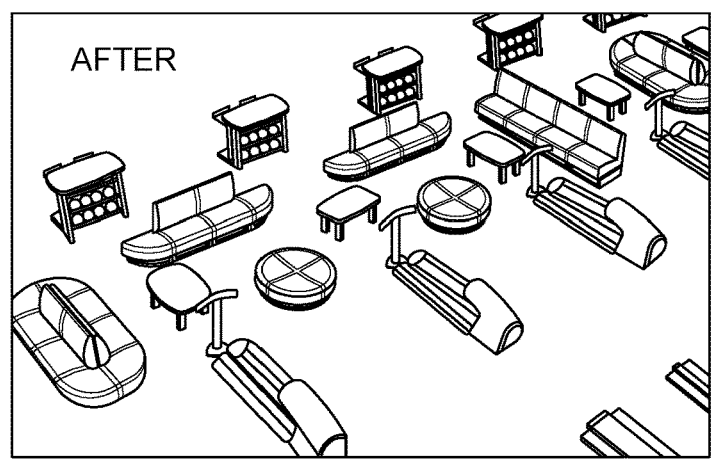

It should be understood by those of skill in the art that many other furniture arrangements are also contemplated by the present invention as shown in FIGS. 9a-9n. More specifically, FIGS. 9a-9n show different combinations of furniture elements for different settee areas, group settings, number of lanes etc. That is, FIGS. 9a-9n show exemplary layouts of a bowling center, implementing the furniture system of the present invention. These combinations include, e.g., seating elements 200a-200c, small quarter round table elements 500a, large quarter round table elements 500b, ball rack system 700a and triangular table (personal table) 700b in different configurations and combinations.

In particular, FIGS. 9a and 9b show, for example, two different seating arrangements in a settee area of 12 feet. FIG. 9a shows a two lane arrangement; whereas, FIG. 9b shows a re-combined furniture arrangement embracing six lanes for a group event. As another example, FIGS. 9c-9e show different furniture arrangements for a settee area of 9 feet. In these arrangements, FIG. 9c shows a two lane arrangement (with the sofa combination in a shorter configuration than in the previous example); whereas, FIG. 9d shows a re-combined furniture arrangement embracing four lanes and FIG. 9e shows a re-combined furniture arrangement embracing six lanes.

FIGS. 9f-9n show additional examples of re-combinations of the furniture elements in accordance with aspects of the present invention, based on two, four and six lane accommodations. In particular, FIGS. 9f, 9i and 9l show two lane arrangements; whereas, FIGS. 9g, 9j and 9m show respective re-combined furniture arrangements embracing four lanes and FIGS. 9h, 9k and 9n show respective re-combined furniture arrangements embracing six lanes.

Accordingly, in view of the description herein it should now be understood that the present invention contemplates a furniture system wherein a first modular furniture element and the second modular furniture element are seating elements and the seating elements provide different shaped arrangements when connected (see, e.g., FIGS. 9a-9n). In alternative embodiments or combinations thereof, the first modular furniture element can be a seating element and the second modular furniture element can be a bowling ball table (see, e.g., FIGS. 9a-9n). Moreover, in alternative embodiments or combinations thereof, the first modular furniture element and the second modular furniture element can be table elements, and the table elements provide different shaped arrangements when connected (see, e.g., FIGS. 6a-6e and 9a-9n). In alternative embodiments or combinations thereof, the first modular furniture element can be a seating element, the second modular furniture element can be a table element and another seating element can be provided that has at least one contacting surface "C" which is structured and dimensioned to correspond with the least one contacting surface "C" of either of the other modular furniture element such that when placed against the least one contacting surface "C" of the other modular furniture element it is parallel to and contacts therewith to form a combination of seating element, table element and seating element arrangement (see, e.g., FIGS. 9a-9n). In yet still further combinations, the first modular furniture element and the second modular furniture element can be seating elements, and another seating element is provided which has at least one contacting surface "C" which is structured and dimensioned to correspond with the least one contacting surface "C" of the second modular furniture element or first modular unit, such that when placed against the least one contacting surface "C" of such unit, it is parallel to and contacts with the at least one contacting surface to form a combination of a three seating element arrangement (see, e.g., FIGS. 9a-9n). Additionally, it is should be understood that the attachment mechanism can be a locking element having components attached to both the first modular furniture element and the second modular furniture element (see, e.g., FIGS. 11-13d); that is, the locking element can be a cam latch system or a threaded system comprising a bolt and screw component.

Figure 10:
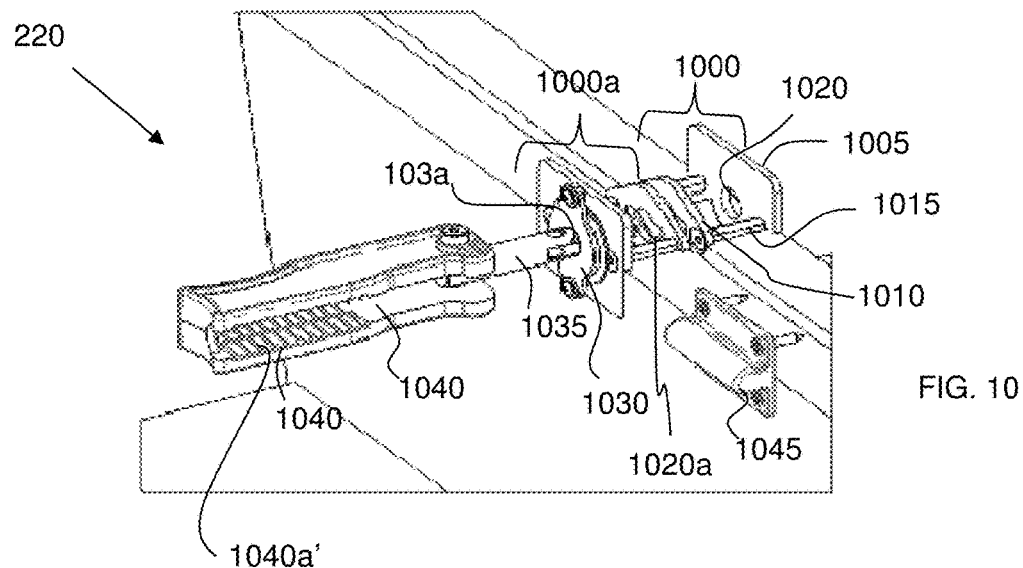
FIG. 10 shows a latch mechanism used with any combination of the furniture elements in accordance with aspects of the present invention.

FIG. 10 shows a latch mechanism used with any combination of the furniture elements in accordance with aspects of the present invention. In particular, the latch mechanism 220 shown in FIG. 10 includes a cam latch plate assembly 1000 and a cam latch plate assembly 1000a, mounted on opposing sides of a respective furniture element, e.g., seating elements 200a-200c, small quarter round table elements 500a, large quarter round table elements 500b and ball rack system 700a.

The cam latch plate assembly 1000 and the cam latch plate assembly 1000a each includes a cam plate 1005 provided on an interior side of a furniture element and a cam latch exterior plate 1010 provided on an exterior side of the furniture element. In embodiments, the cam plate 1005 and the cam latch exterior plate 1010 are connected to one another by a fastening system 1015, e.g., anchor system, nut and bolt system, rivets, etc., extending through a wall of the respective furniture element. In embodiments, the cam plate 1005 includes an opening 1020 aligned with a keyed opening 1020a of the cam latch exterior plate 1010, e.g., for each furniture element and for adjacent furniture elements. The cam latch plate assembly 1000a also includes a cam latch thrust plate 1030, which includes an opening 1030a aligned with the openings 1020, 1020a.

Still referring to FIG. 10, a cam lock pin 1035 is extendable through the openings 1020, 1020a and 1030a, and is rotatable by use of a hinge mounted handle 1040. In embodiments, the handle 1040 includes a profile 1040a, e.g., cavity or detent, that mates with a cam latch holder 1045, when in a locked position. More specifically, the detent or cavity 1040a of the handle 1040 can include a friction grip 1040a', e.g., ribbed surface, which engages with the cam latch holder 1045 to ensure a tight frictional fit.

Figure 11:
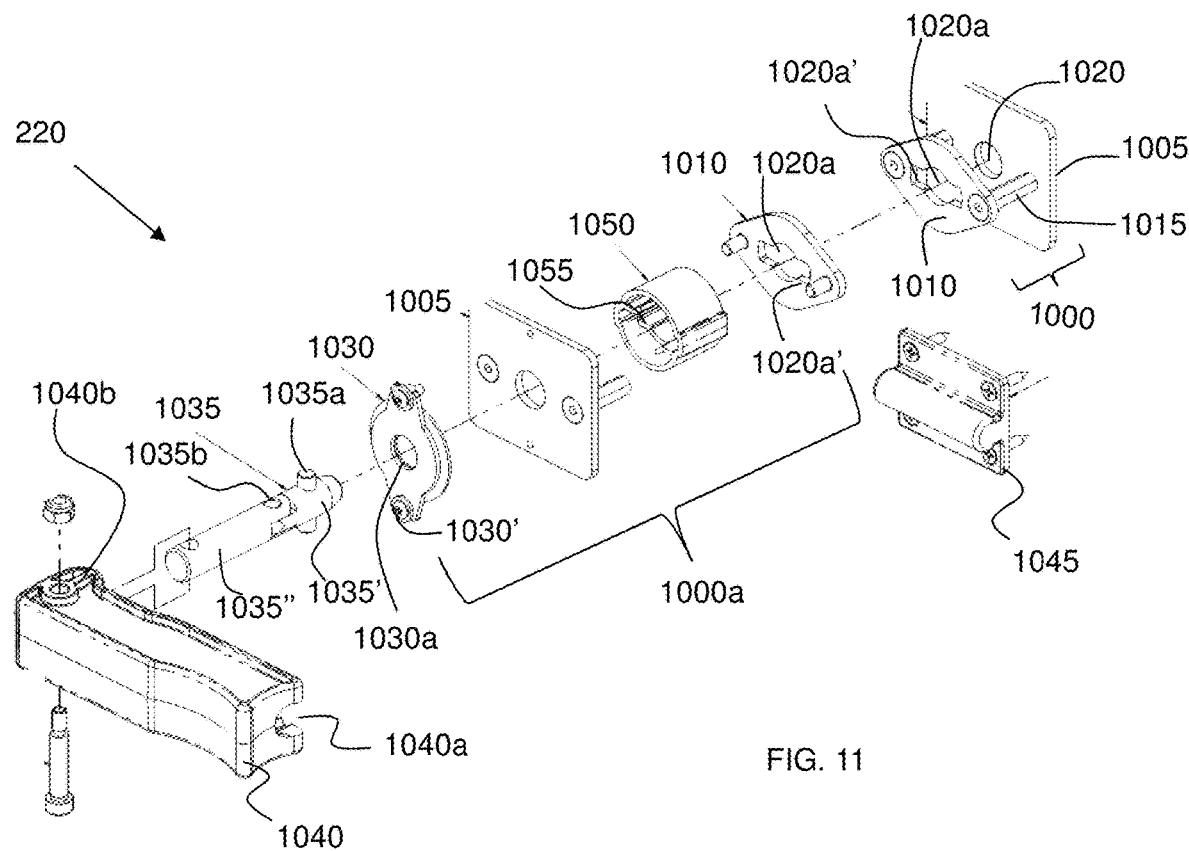
FIG. 11 shows an exploded view of the latch mechanism in accordance with aspects of the present invention.

FIG. 11 shows an exploded view of the latch mechanism 220 in accordance with aspects of the present invention. In embodiments, the cam latch plate assembly 1000 and the cam latch plate assembly 1000a each includes the cam plate 1005 with the opening 1020 aligned with the keyed opening 1020a of the cam latch exterior plate 1010. In embodiments, the keyed opening 1020a includes, for example, a slotted section 1020a' with an elongated cross sectional profile. The cam plate 1005 and cam latch exterior plate 1010 are connected to one another by the fastening system 1015, e.g., anchor system, nut and bolt system, rivets, etc.

The cam latch plate assembly 1000a also includes the cam latch thrust plate 1030. In embodiments, the cam latch thrust plate 1030 is attached to the cam plate 1005 by, for example, screws, rivets or other fastening devices 1030'. A cam latch tee pin guide 1050 is disposed between the cam plate 1005 and cam latch exterior plate 1010 of the cam latch plate assembly 1000a. In embodiments, the cam latch tee pin guide 1050 includes a guide wall 1055, which is structured to maintain alignment of a key or pin portion 1035a extending outwardly from an end of the cam lock pin 1035 with the slotted sections 1020a' of the keyed openings 1020a. In this way, the key portion 1035a of the cam lock pin 1035 can be inserted through the keyed openings 1020 when assembling or disassembling the furniture elements into different configurations. In the locked position, the cam lock pin 1035 is inserted through the slotted sections 1020a' and then rotated 90 degrees, resulting in the key portion 1035a being misaligned with the slotted sections 1020a' and hence locked behind the cam latch exterior plate 1010. That is, the key portion 1035a will contact a surface of the cam latch exterior plate 1010, resulting in a locked state.

Referring still to FIG. 11, the cam lock pin 1035 includes a hinged portion 1035b, connecting a first section 1035' to a second section 1035". In embodiments, the first section 1035' is shorter than the second section 1035". The handle 1040 is hingedly attached to the second section 1035" of the cam lock pin 1035. The handle 1040 includes a detent or cavity 1040a which has a cross section corresponding to that of the cam latch holder 1045. The detent or cavity 1040a can also accommodate the second section 1035" of the cam lock pin 1035. The handle 1040 also includes a cam portion 1040b, e.g., protuberance.

Figure 12A:
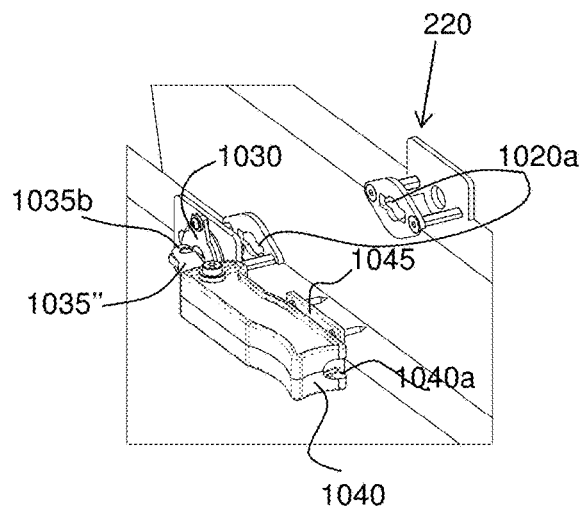
FIGS. 12a-12g show a sequence of operations for connecting adjacent furniture elements using the latch mechanism in accordance with aspects of the present invention.
Figure 12B:
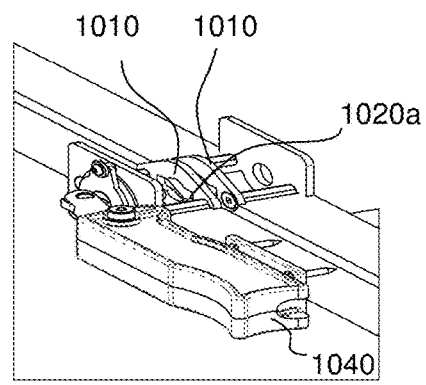

FIGS. 12a-12g show a sequence of operations for locking or fastening together adjacent furniture elements using the latch mechanism 220 in accordance with aspects of the present invention. Specifically, FIG. 12a shows the latch mechanism 220 in an unlatched and closed state. In particular, in this representation, the two furniture elements, e.g., any combination of the modular elements 200a, 200b, 200c, 500a and 500b, are detached from one another, e.g., positioned remotely with respect to one another, and the detent or cavity 1040a of the handle 1040 is engaged with the cam latch holder 1045. In this position, the key portion 1035a of the cam lock pin 1035 is remotely positioned from the slotted section 1020a' of the cam latch exterior plate 1010 of both furniture elements. Also, in this position, the second section 1035" of the cam lock pin 1035 is positioned within the detent or cavity 1040a of the handle 1040. The orientation of the second section 1035" of the cam lock pin 1035 can be achievable due to the hinged portion 1035b of the cam lock pin 1035. Also, In FIG. 12b, the two furniture elements are moved towards one another such that the cam latch exterior plate 1010 of each furniture element is aligned with one another. In this way, the keyed openings 1020a are also aligned.

Figure 12C:
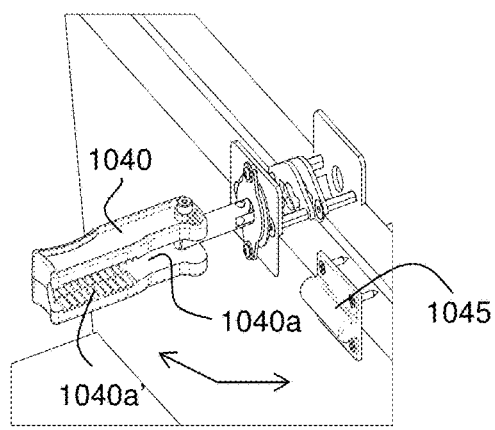

In FIG. 12c, the handle 1040 is pivoted into the open position, e.g., the handle 1040 is no longer engaged with the cam latch holder 1045. In this state, the second section 1035" of the cam lock pin 1035 will also pivot such that the first section 1035' and second section 1035" of the cam lock pin 1035 are in axial alignment. The pivoting of the second section 1035" is achievable using the hinge 1035b between the first section 1035' and second section 1035".

Figure 12D:
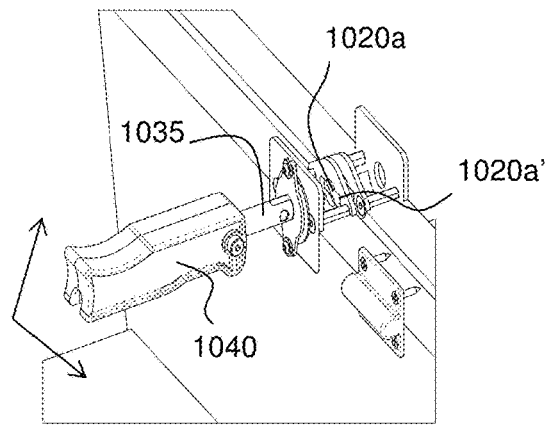
Figure 12E:
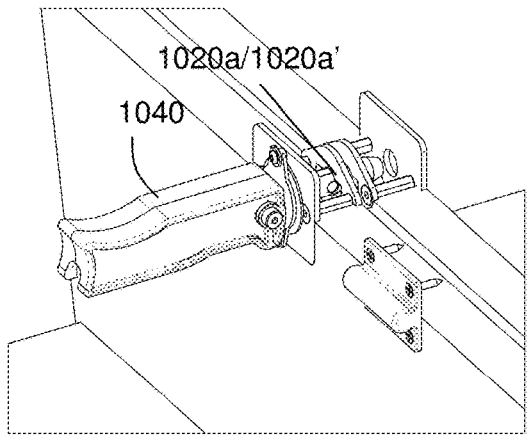
Figure 12F:
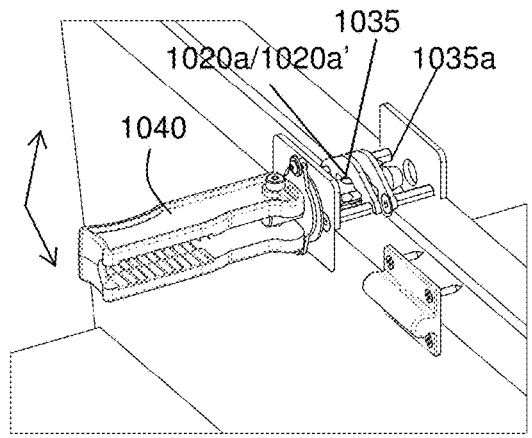

In FIG. 12d, the handle 1040 is rotated 90 degrees such that the key portion 1035a of the cam lock pin 1035 is aligned with the slotted sections 1020a' of the keyed openings 1020 of each cam latch exterior plate 1010 of adjacent furniture elements. In FIG. 12e, the handle 1040 is pushed inward such that the key portion 1035a of the cam lock pin 1035 extends through the slotted sections 1020a' of the keyed openings 1020 of the cam latch exterior plate 1010 of adjacent furniture elements. In FIG. 12f, the handle 1040 is rotated to its original orientation, e.g., backwards 90 degrees, such that the key portion 1035a of the cam lock pin 1035 is now misaligned with the slotted sections 1020a' of the keyed openings 1020. That is, the key portion 1035a of the cam lock pin 1035 is now locked behind of the cam latch exterior plate 1010 of the adjacent furniture element.

Figure 12G:
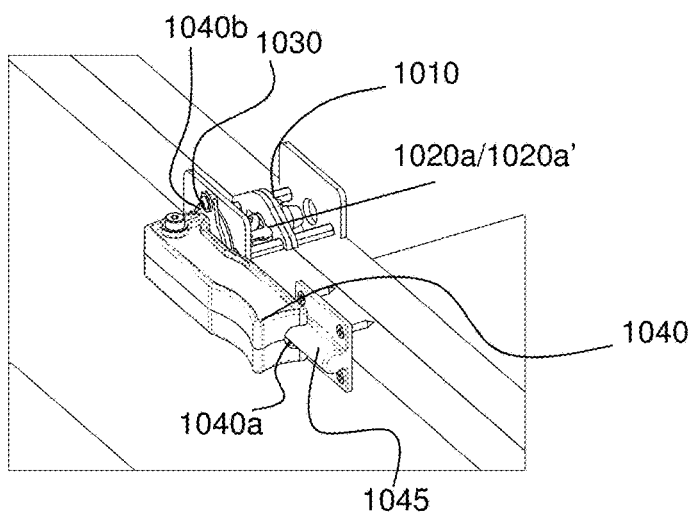

In FIG. 12g, the handle 1040 is pivoted into the closed, locked position, e.g., the handle 1040 is engaged with the cam latch holder 1045. As shown in FIG. 12g, the handle 1040 is of such a length that it will still mate with the cam latch holder 1045, in the locked state. In the closed position, the cam portion 1040b of the handle 1040 will exert pressure or force on the cam latch thrust plate 1030 which, in turn, will move the furniture elements together and also ensure that the handle 1040 remains in a locked position. Disassembly of the furniture elements can be achieved by reversing the sequence of events.

FIGS. 13a-13d show a sequence of operations for connecting adjacent furniture elements using an alternative latch mechanism in accordance with aspects of the present invention. For example, the alternative latch mechanism 220' includes a cam latch exterior plate 1010 and cam plate 1005' attached on opposing sides of a furniture element, using the fastening system 1015, e.g., anchor system, nut and bolt system, rivets, etc. In embodiments, the cam latch exterior plate 1010 is provided on the exterior side of the furniture element; whereas, the cam plate 1005' is provided on the interior side of the furniture element. The cam plate 1005' includes an opening 1005a aligned with an opening 1020 of the cam latch exterior plate 1010. The opening 1005a of the cam plate 1005' includes a thread 1005a' which engages with a threaded portion 1300' of a bolt 1300. The bolt 1300 also includes a handle 1300".

Figure 13A:
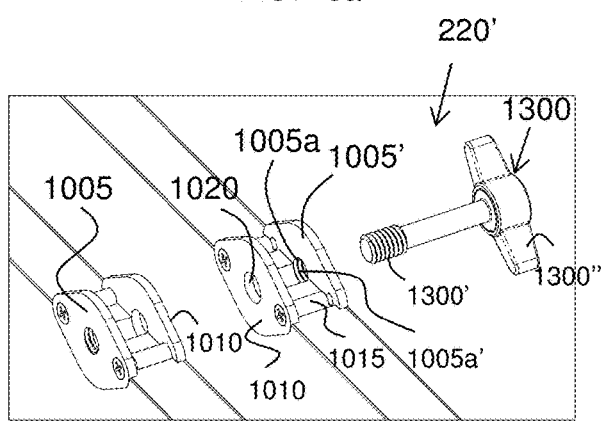
FIGS. 13a-13d show a sequence of operations for connecting adjacent furniture elements using an alternative latch mechanism in accordance with aspects of the present invention.

As shown in FIG. 13a the latch mechanism 220' is in an unlatched state. In particular, in this representation, the two furniture elements, e.g., any combination of the modular elements 200a, 200b, 200c, 500a and 500b, are detached from one another, e.g., positioned remotely with respect to one another, and the threaded portion 1300' of the bolt 1300 is not threaded to the thread 1005a' of the cam plate 1005'. It should be understood by those of skill in the art, though, that the threaded portion 1300' of the bolt 1300 can be threaded to the thread 1005a' of the nearest cam plate 1005' and still be in the unlatched state.

Figure 13B:
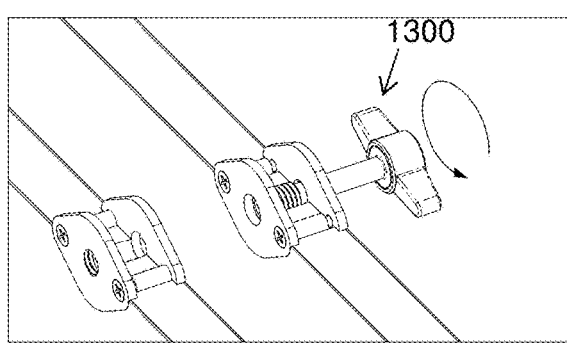
Figure 13C:
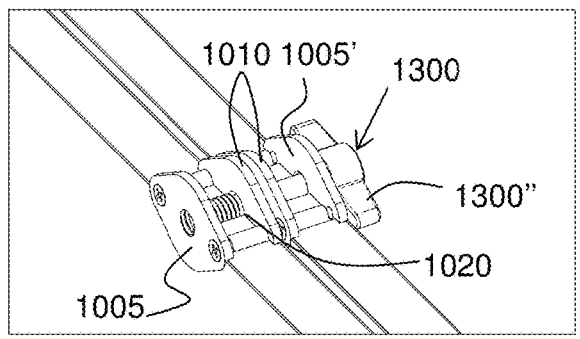
Figure 13D:
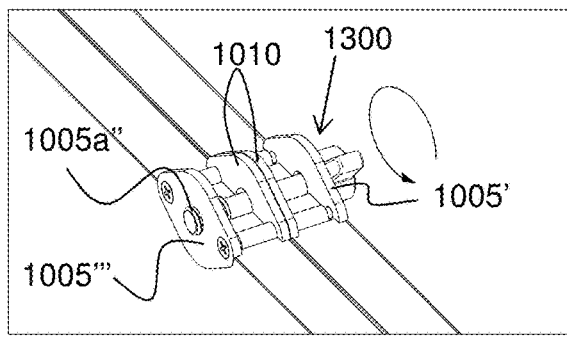

In FIG. 13b, the threaded portion 1300' of the bolt 1300 can be threaded through the thread 1005a' of the nearest cam plate 1005', remaining between the cam plate 1005' and the cam latch exterior plate 1010 of the first furniture element. As shown in FIG. 13c, the two furniture elements are moved together, e.g., towards one another, and the bolt 1300 is inserted through the aligned openings 1020 of adjacent cam latch exterior plates 1010. As shown in FIG. 13d, the handle 1300" is rotated in order to screw the threaded portion 1300' of the bolt 1300 into the threaded portion 1005a" of the cam plate 1005'" of the adjacent furniture element. By rotating the bolt 1005, the furniture elements will move together and be in a locked position. Disassembly of the furniture elements can be achieved by reversing the sequence of events.

Accordingly, the present invention contemplates a method of arranging the modular furniture units, as should already be understood in view of the above description. In embodiments, for example, the method includes arranging a first modular furniture unit (e.g., ball rack system triangular table (personal table) or any of the seating element) adjacent to a second modular furniture unit (e.g., ball rack system triangular table (personal table) or any of the seating element) such that a first portion of a fastening (locking or attaching) mechanism arranged on the first modular furniture unit aligns with a second portion of the fastening (locking or attaching) mechanism arranged on the second modular furniture. The method further includes engaging the first portion of the fastening (locking or attaching) mechanism arranged on the first modular furniture unit with the second portion of the fastening (locking or attaching) mechanism arranged on the second modular furniture unit. The method further includes attaching or locking the first portion of the fastening (locking or attaching) mechanism arranged on the first modular furniture unit to the second portion of the fastening (locking or attaching) mechanism arranged on the second modular furniture unit to form a single furniture unit comprising the first modular furniture unit and the second modular furniture unit. In embodiments, the fastening (locking or attaching) mechanism can simply be a clip or other component to ensure that the modular units remain together.

As should be understood by those of skill in the art, any of the furniture configurations of the present invention can be provided in the settee area, depending on the dimensions of the settee area and other furniture elements placed therein. In this way, the furniture configurations of the present invention can answer to the several different needs of the entertainment bowling centers. That is, depending on the needs of the bowling center, the furniture configurations can be configured to have different number and types of seats in combination with different tables, including those discussed above. In this way, the configurability of the furniture elements of the present invention permits the bowling center to create many different seating configurations, using in the best way the specific size of the settee area and answering to the specific needs of the center.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A furniture system comprising:
at least one modular furniture element with a fastening mechanism comprising a first assembly and a second assembly; and
the first assembly of the fastening mechanism comprising an engaging element which extends through at least one component of the first assembly and attaches to a component of the second assembly of an adjacent modular furniture element,
wherein the components of the first assembly and the second assembly comprise a cam plate provided on an interior side of the at least one modular furniture element and a cam latch exterior plate provided on an exterior side of the at least one modular furniture element, and the one component is the cam latch exterior plate;
the cam plate includes an opening aligned with a keyed opening of the cam latch exterior plate;
the engaging element comprises a cam lock pin extendable through the opening and the keyed opening;
the cam lock pin comprises a pin extending outwardly from a first end of the cam lock pin and which is profiled to extend through the keyed opening and be lockable against a surface of the cam latch exterior plate of the second assembly when rotated;
the first assembly of the fastening mechanism further comprises a cam latch plate disposed against the cam plate on a side facing away from the cam latch exterior plate, the cam latch plate includes an opening aligned with the opening of the cam plate and keyed opening such that the cam lock pin is extendable through the opening of the cam plate and the cam latch plate and the keyed opening; and
a cam mechanism located at a second end of the cam lock pin and which is profiled to exert pressure on the cam latch plate and presses the outwardly extending pin against the surface of the cam latch exterior plate when the cam mechanism is moved into a locking position.

2. The furniture system of claim 1, wherein the cam plate and the cam latch exterior plate are connected to one another by a fastening system extending through a wall of the at least one modular furniture element.

3. The furniture system of claim 1, wherein the at least one modular furniture element includes various seating elements, table elements and a ball rack system.

4. A furniture system comprising:
a first modular furniture element comprising a first assembly of a locking mechanism; and
a second modular furniture element comprising a second assembly of the locking mechanism;
the first assembly and the second assembly comprising:
a cam plate provided on an interior side of the first modular furniture element and the second modular furniture element;
a cam latch exterior plate provided on an exterior side of the first modular furniture element and the second modular furniture element; and
a fastening system connecting the cam plate to the cam latch exterior plate on opposing sides of a wall;
the first assembly of the locking mechanism additionally comprising a lockable element which extends through an opening of the cam plate and a keyed opening of the cam latch exterior plate of the first modular furniture element and engages with one of the cam latch exterior plate and cam plate of the second modular furniture element, and wherein:
the first assembly of the locking mechanism further comprises a cam latch plate disposed on a side of the cam plate facing away from the cam latch exterior plate and which includes an opening aligned with the opening of the cam plate and the keyed opening;
the lockable element further comprises a handle hinge mounted to a cam lock pin which is rotatable and pivotable, and a pin extending outwardly from another end of the cam lock pin which is profiled to extend through the keyed opening and be lockable against a surface of the cam latch exterior plate of the second assembly; and
the handle comprises a cam mechanism, and
the handle is pivotable and rotatable such that the cam mechanism applies pressure to the cam latch plate and presses the outwardly extending pin against the surface of the cam latch exterior plate, respectively, when the cam mechanism is in a locking position.

5. The furniture system of claim 4, wherein:
the opening of the cam plate is aligned with the keyed opening of the cam latch exterior plate;
the lockable element comprises the cam lock pin which is extendable through the opening of the cam plate and the keyed opening; and
the cam lock pin comprises the pin extending outwardly from an end of the cam lock pin which is profiled to extend through the keyed opening and lockable against a surface of the cam latch exterior plate when rotated; and further comprising:
a cam latch tee pin guide disposed between the cam plate and the cam latch exterior plate of the first assembly, wherein the cam latch tee pin guide includes a guide wall structured to maintain alignment of the pin of the cam lock pin so that it can extend through the keyed opening.

6. The furniture system of claim 4, wherein:
the cam lock pin includes a hinged portion, connecting a first section to a second section;
the handle is hingedly attached to the second section of the cam lock pin; and
the handle includes a detent which has a cross section which accommodates a cam latch holder and the second section of the cam lock pin.

7. A furniture system comprising:
at least one modular furniture element with a fastening mechanism comprising a first assembly and a second assembly; and
the first assembly of the fastening mechanism comprising an engaging element which extends through at least one component of the first assembly and attaches to a component of the second assembly of an adjacent modular furniture element,
wherein the components of the first assembly and the second assembly comprise a cam plate provided on an interior side of the at least one modular furniture element and a cam latch exterior plate provided on an exterior side of the at least one modular furniture element, and the one component is the cam latch exterior plate, and further comprising:
a cam latch plate positioned on the interior side of the at least one modular furniture element and disposed against the cam plate on a side facing away from the cam latch exterior plate, wherein:
the engaging element comprises a handle hinge mounted to a cam lock pin which extends through openings in the cam plate, the cam latch exterior plate and the cam latch plate of the first assembly and the cam latch exterior plate of the second assembly, and the handle comprises a cam mechanism which, when the cam mechanism is in a locked state, applies pressure to the cam latch plate, and a pin extending outwardly from an end of the cam lock pin and which is profiled to extend through the opening of the cam latch exterior plate of the second assembly, and exert pressure against a surface of the cam latch exterior plate when the cam mechanism is in the locked state applying pressure to the cam latch plate.

8. The furniture system of claim 7, wherein the cam plate includes an opening aligned with the opening of the cam latch exterior plate, the opening being a keyed opening of the cam latch exterior plate.

9. The furniture system of claim 8, wherein:
the cam lock pin is extendable through the opening and the keyed opening; and
the cam lock pin comprises the pin extending outwardly from the end of the cam lock pin and which is profiled to extend through the keyed opening and be lockable against the surface of the cam latch exterior plate when rotated.

10. The furniture system of claim 9, wherein the cam latch plate faces the cam latch exterior plate, the cam latch plate includes an opening aligned with the opening of the cam plate and keyed opening such that the cam lock pin is extendable through the opening of the cam plate and the cam latch plate and the keyed opening.

11. The furniture system of claim 10, wherein:
the handle hinge mounted to the cam lock pin is rotatable and pivotable.

12. The furniture system of claim 11, further comprising a cam latch tee pin guide disposed between the cam plate and the cam latch exterior plate of the first assembly, wherein the cam latch tee pin guide includes a guide wall structured to maintain alignment of the pin of the cam lock pin so that it can extend through the keyed opening.

13. The furniture system of claim 11, wherein:
the cam lock pin includes a hinged portion, connecting a first section to a second section;
the first section is shorter than the second section;
the handle is hingedly attached to the second section of the cam lock pin; and
the handle includes a detent which has a cross section corresponding to that of a cam latch holder and which accommodates the second section of the cam lock pin.

14. The furniture system of claim 7, wherein the cam latch plate is part of the first assembly.

15. A furniture system comprising:
at least one modular furniture element with a fastening mechanism comprising a first assembly and a second assembly; and
the first assembly of the fastening mechanism comprising an engaging element which extends through at least one component of the first assembly and attaches to a component of the second assembly of an adjacent modular furniture element, and
wherein the components of the first assembly and the second assembly comprise a cam plate provided on an interior side of the at least one modular furniture element and a cam latch exterior plate provided on an exterior side of the at least one modular furniture element, and the one component is the cam latch exterior plate, and
the engaging element comprises:

a cam lock pin which includes a hinged portion, connecting a first section to a second section, and a pin portion extending outwardly from the first section of the cam lock pin; and a handle hingedly attached to the second section of the cam lock pin, wherein:

the cam lock pin and the outwardly extending pin portion extend though openings of the cam plate and the cam latch exterior plate of the first assembly and the cam latch exterior plate of the second assembly and, in a locked position, the outwardly extending pin portion rests on a surface of the cam latch exterior plate, and the handle includes a cam mechanism and a detent, the detent includes a cross section corresponding to that of a cam latch holder and which accommodates the second section of the cam lock pin, and the cam mechanism, when pivoted into a locking position, exerts pressure against the cam plate and presses the outwardly extending pin portion against the surface of the cam latch exterior plate.

16. A furniture system comprising:
at least one modular furniture element with a fastening mechanism comprising a first assembly and a second assembly; and
the first assembly of the fastening mechanism comprising an engaging element which extends through at least one component of the first assembly and attaches to a component of the second assembly of an adjacent modular furniture element,
wherein the components of the first assembly and the second assembly comprise a cam plate provided on an interior side of the at least one modular furniture element and a cam latch exterior plate provided on an exterior side of the at least one modular furniture element, and the one component is the cam latch exterior plate, and further comprising:

a cam lock pin having an outwardly extending pin which extends though openings of the cam plate and the cam latch exterior plate of the first assembly and the cam latch exterior plate of the second assembly and is lockable against a surface of the cam latch exterior plate of the second assembly; and a handle hingedly attached to the cam lock pin and which includes a cam portion which exerts force on the cam plate provided on the interior side of the at least one modular furniture element, while the outwardly extending pin exerts force on the surface of the cam latch exterior plate when the cam portion is in a locking positon.

17. A furniture system comprising:
at least one modular furniture element with a fastening mechanism comprising a first assembly and a second assembly; and
the first assembly of the fastening mechanism comprising an engaging element which extends through at least one component of the first assembly and attaches to a component of the second assembly of an adjacent modular furniture element,
wherein the components of the first assembly and the second assembly comprise a cam plate provided on an interior side of the at least one modular furniture element and a cam latch exterior plate provided on an exterior side of the at least one modular furniture element, and the one component is the cam latch exterior plate, and
wherein the first assembly of the fastening mechanism further comprises a cam latch plate disposed on a side of the cam plate facing away from the cam latch exterior plate, the cam latch plate includes an opening aligned with an opening of the cam plate and a keyed opening of the cam latch exterior plate, and the engaging element comprises a cam mechanism and a cam lock pin having an outwardly extending pin which is extendable through the opening of the cam plate and the cam latch plate and the keyed opening and is lockable against a surface of the cam latch exterior plate of the second assembly, and when in a locked position, the cam mechanism applies pressure on a surface of the cam latch plate and presses the outwardly extending pin against the surface of the cam latch exterior plate of the second assembly.

18. A furniture system comprising:
at least one modular furniture element with a fastening mechanism comprising a first assembly and a second assembly; and
the first assembly of the fastening mechanism comprising an engaging element comprising a cam lock pin having an outwardly extending pin which extends through at least one component of the first assembly and a component of the second assembly of an adjacent modular furniture element,
wherein the components of the first assembly and the second assembly comprise a cam plate provided on an interior side of the at least one modular furniture element and a cam latch exterior plate provided on an exterior side of the at least one modular furniture element, and wherein:
the first assembly comprises a cam latch plate disposed on a side of the cam plate facing away from the cam latch exterior plate and which includes an opening aligned with an opening of the cam plate and a keyed opening of the cam latch exterior plate, wherein the cam lock pin is extendable through the opening of the cam plate, the cam latch exterior plate and the cam latch plate and is lockable against a surface of the cam latch exterior plate of the second assembly;
the engaging element comprises a handle hinge mounted to the cam lock pin and which is rotatable and pivotable; and
the handle comprises a cam mechanism which, when the cam mechanism is in a locked state, the cam mechanism applies pressure to the cam latch plate and presses the outwardly extending pin against the surface of the cam latch exterior plate of the second assembly.

19. A furniture system comprising:
a first modular furniture element comprising a first assembly of a locking mechanism; and
a second modular furniture element comprising a second assembly of the locking mechanism;
the first assembly and the second assembly comprising:
a cam plate provided on an interior side of the first modular furniture element and the second modular furniture element;
a cam latch exterior plate provided on an exterior side of the first modular furniture element and the second modular furniture element; and
a fastening system connecting the cam plate to the cam latch exterior plate on opposing sides of a wall;
the first assembly of the locking mechanism additionally comprising a lockable element which extends through an opening of the cam plate and cam latch exterior plate of the first modular furniture element and engages with one of the cam latch exterior plate and cam plate of the second modular furniture element, wherein:

the locking mechanism comprises a cam lock pin having a pin extending outwardly therefrom and a handle hinge mounted to the cam lock pin on another end, the cam lock pin and pin extend through openings in the cam plate, the cam latch exterior plate of the first assembly and the cam latch exterior plate of the second assembly and is lockable against a surface of the cam latch plate of the second assembly; and
the handle comprises a cam mechanism which, when the cam mechanism is in a locked state, applies pressure to the cam plate of the first assembly; and
the pin has a profile such that when the cam lock pin is rotatable into the locked state, and when the cam mechanism is in the locked state, the outwardly extending pin presses against the surface of the cam latch exterior plate of the second assembly.

20. A furniture system comprising:
a first modular furniture element comprising a first assembly of a locking mechanism; and
a second modular furniture element comprising a second assembly of the locking mechanism;
the first assembly and the second assembly comprising:
a cam plate provided on an interior side of the first modular furniture element and the second modular furniture element;
a cam latch exterior plate provided on an exterior side of the first modular furniture element and the second modular furniture element; and
a fastening system connecting the cam plate to the cam latch exterior plate on opposing sides of a wall;
the first assembly of the locking mechanism additionally comprising a lockable element which extends through an opening of the cam plate and cam latch exterior plate of the first modular furniture element and engages with one of the cam latch exterior plate and cam plate of the second modular furniture element, wherein the lockable element comprises:
a cam lock pin which includes a hinged portion, connecting a first section to a second section; and
a handle hingedly attached to the second section of the cam lock pin, wherein:
the cam lock pin includes a pin outwardly extending from the first section which extends though openings of the cam latch exterior plate of the first assembly and the cam latch exterior plate of the second assembly and is lockable against a surface of the cam latch exterior plate, and
the handle includes a cam mechanism and a detent, the detent has a cross section corresponding to that of a cam latch holder and which accommodates the second section of the cam lock pin, and
when in a locked state, the cam mechanism applies pressure to the cam plate of the first assembly and the outwardly extending pin presses against the surface of the cam latch exterior plate of the second assembly.

21. A furniture system comprising:
a first modular furniture element comprising a first assembly of a locking mechanism; and
a second modular furniture element comprising a second assembly of the locking mechanism;
the first assembly and the second assembly comprising:
a cam plate provided on an interior side of the first modular furniture element and the second modular furniture element;
a cam latch exterior plate provided on an exterior side of the first modular furniture element and the second modular furniture element; and a fastening system connecting the cam plate to the cam latch exterior plate on opposing sides of a wall;

the first assembly of the locking mechanism additionally comprising a lockable element which extends through an opening of the cam plate and cam latch exterior plate of the first modular furniture element and engages with one of the cam latch exterior plate and cam plate of the second modular furniture element, wherein the lockable element comprises:

a cam lock pin with a pin outwardly extending therefrom, the cam lock pin and the pin extend though openings of the first assembly and the second assembly and, in a locked position, the outwardly extending pin engages with a surface of the cam latch exterior plate of the second modular furniture element; and a handle hingedly attached to the cam lock pin and which includes a cam portion which exerts force on the cam plate provided on the interior side of the first modular furniture element and presses the outwardly extending pin against the surface of the cam latch exterior plate when in a locked position.

22. A furniture system comprising:

a first modular furniture element comprising a first assembly of a locking mechanism; and a second modular furniture element comprising a second assembly of the locking mechanism;

the first assembly and the second assembly comprising:

a cam plate provided on an interior side of the first modular furniture element and the second modular furniture element;

a cam latch exterior plate provided on an exterior side of the first modular furniture element and the second modular furniture element; and a fastening system connecting the cam plate to the cam latch exterior plate on opposing sides of a wall;

the first assembly of the locking mechanism additionally comprising a lockable element comprising a cam lock pin and a pin outwardly extending from the cam lock pin, the cam lock pin and the pin extend through an opening of the cam plate and cam latch exterior plate of the first modular furniture element and an opening of the cam latch exterior plate of the second modular furniture element, and, in a locked position, the outwardly extending pin engages with a surface of the cam latch exterior plate of the second modular furniture element, wherein the first assembly further comprises a cam latch plate disposed against the cam plate on a side facing away from the cam latch exterior plate, and having an opening aligned with the opening of the cam plate of both the first assembly and the second assembly, wherein the cam lock pin is extendable through the opening of the cam plate, the cam latch exterior plate and the cam latch plate, and a cam mechanism located at an end of the cam lock pin which, when pivoted from a first position to a second position, presses against the cam latch plate of the first modular furniture element and presses the outwardly extending pin against the surface of the cam latch exterior plate of the second modular furniture element.

23. A furniture system comprising:

a first modular furniture element comprising a first assembly of a locking mechanism; and a second modular furniture element comprising a second assembly of the locking mechanism;

the first assembly and the second assembly comprising:

a cam plate provided on an interior side of the first modular furniture element and the second modular furniture element;

a cam latch exterior plate provided on an exterior side of the first modular furniture element and the second modular furniture element; and a fastening system connecting the cam plate to the cam latch exterior plate on opposing sides of a wall;

the first assembly of the locking mechanism additionally comprising a lockable element which extends through an opening of the cam plate and cam latch exterior plate of the first modular furniture element and engages with one of the cam latch exterior plate and cam plate of the second modular furniture element, wherein:

the first assembly comprises a cam latch plate disposed against the cam plate on a side facing away from the cam latch exterior plate, and which includes an opening aligned with an opening of the cam plate and a keyed opening of the cam latch exterior plate;

the lockable element comprises a handle hinge mounted to a cam lock pin and which is rotatable and pivotable, wherein the cam lock pin is extendable through the opening of the cam plate, the cam latch exterior plate and the cam latch plate and is lockable against a surface of the cam latch exterior plate of the second assembly; and the handle comprises a cam mechanism which, when the cam mechanism is in a locked state, applies pressure to the cam latch plate; and a pin outwardly extending from the cam lock pin on an end remote from the handle, the outwardly extending pin extending through the keyed opening of the cam latch exterior plate and, when the cam mechanism is in the locked state, presses against the surface of the cam latch exterior plate of the second assembly.

* * * * *